(12) United States Patent
Boecke et al.

(10) Patent No.: US 12,280,881 B2
(45) Date of Patent: Apr. 22, 2025

(54) AIRCRAFT PROPULSION UTILIZING A SAFETY CRITICAL ENERGY MANAGEMENT SYSTEM

(71) Applicant: BAE Systems Controls Inc., Endicott, NY (US)

(72) Inventors: Matthew S. Boecke, Endicott, NY (US); Arthur P. Lyons, Maine, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 18/352,763

(22) Filed: Jul. 14, 2023

(65) Prior Publication Data
US 2024/0017844 A1   Jan. 18, 2024

Related U.S. Application Data

(60) Provisional application No. 63/389,599, filed on Jul. 15, 2022.

(51) Int. Cl.
*B64D 27/24* (2024.01)
*B64D 31/06* (2024.01)
*B64D 27/02* (2006.01)

(52) U.S. Cl.
CPC .............. *B64D 27/24* (2013.01); *B64D 31/06* (2013.01); *B64D 27/026* (2024.01)

(58) Field of Classification Search
CPC ....... B64D 27/24; B64D 31/06; B64D 27/026
USPC ............................................... 307/9.1
See application file for complete search history.

(56) References Cited

U.S. PATENT DOCUMENTS

| | | | |
|---|---|---|---|
| 7,406,370 B2 | 7/2008 | Kojori et al. | |
| 11,065,979 B1 | 7/2021 | Demont et al. | |
| 11,447,035 B1 * | 9/2022 | Hull | B60L 58/14 |
| 2015/0363981 A1 | 12/2015 | Ziarno et al. | |
| 2018/0190048 A1 | 7/2018 | Safa-Bakhsh | |
| 2018/0237148 A1 * | 8/2018 | Hehn | B64D 31/06 |
| 2021/0107679 A1 | 4/2021 | Dunning et al. | |
| 2022/0416660 A1 * | 12/2022 | Zhou | H02J 7/0024 |
| 2024/0291121 A1 | 8/2024 | Mallery et al. | |

OTHER PUBLICATIONS

International Search Report, PCT/US23/27789, mailed Nov. 27, 2023, 17 pages.

* cited by examiner

*Primary Examiner* — Michael R. Fin
(74) *Attorney, Agent, or Firm* — Scully Scott Murphy & Presser PC; Gary McFaline

(57) ABSTRACT

An energy management system (EMS) for an aircraft is provided. The aircraft may have one of a plurality of propulsion systems such as a parallel hybrid electric propulsion system, a parallel turbo electric propulsion system, an electric propulsion system, a turbo electric propulsion system and a turbo hybrid electric propulsion system. The EMS comprises redundant control paths for controlling safety critical operation. Each redundant control path is configured to independently determine whether to electrically isolate a line replaceable unit (LRU) from a high voltage DC link (HVDC link) based on status information from the LRU. The isolation is based on the independent determination. The HVDC link is used for propulsion. The number of the redundant control paths and components may be depending on the type of the propulsion system.

23 Claims, 19 Drawing Sheets

Fig. 2

Parallel Turbo Propulsion Unit 25A

- 510 — (propeller)
- 505 — Mixing Gear Box
- 435A, 430A, 435B
- 425A — (generator)
- 440A
- 400A — Power Conversion Unit
  - 405A Control Unit
  - 410A Power Stage
  - 415A Input/Output Filtering
  - 425A Bus Tie Contactors/Circuit Breakers 1:N Instantiations

Turbo Generator 20B

- 430 — (turbine)
- 435
- 425 — (generator)
- 440
- 400 — Power Conversion Unit
  - 405 Control Unit
  - 410 Power Stage
  - 415 Input/Output Filtering
  - 215 Bus Tie Contactors/Circuit Breakers 1:N Instantiations

Energy Management System 10

- 225A, 225B
- 300 System Control Unit
- 305 Power Conversion Unit
- 310 Power Distribution Unit
- 215 Bus Tie Contactors/Circuit Breakers

Energy Storage System 20A

- 225
- 200 Control Unit
- 205 Energy Storage Devices
- 210 Thermal Management
- 215 Bus Tie Contactors/Circuit Breakers 1:N Instantiations

100A

AIRCRAFT PROPULSION UTILIZING A SAFETY CRITICAL ENERGY MANAGEMENT SYSTEM

CROSS-REFERENCE TO RELATED APPLICATIONS

This application claims the benefit of U.S. Provisional Application No. 63/389,599, filed on Jul. 15, 2022, which is incorporated by reference herein in its entirety.

FIELD OF THE DISCLOSURE

This disclosure relates to energy management systems for different aircraft propulsion architectures.

BACKGROUND

Most known aircrafts use prime movers such as jet engines for propulsion. However, recently proposed are using either electric motor(s) to provide the propulsion or for supplementing the jet engines for propulsion. While using an electric motor or hybrid electric power is commonplace for ground vehicles such as cars or buses, using the same in aircrafts has not been successfully applied. This is because many of the techniques used for ground vehicles do not directly translate to aircraft propulsion. This is also because of the power requirements for aircraft propulsion is significantly higher than a car or bus and flight duration.

Aircrafts systems also require extensive testing to meet strict safety requirements to pass a certification. The testing includes hardware and software elements of the system such that the system has an extremely low probability of catastrophic failure. Catastrophic failure is a failure that can result in an imminent loss of life and property.

SUMMARY

Accordingly, disclosed is an energy management system (EMS) for an aircraft. The EMS may be connected with a plurality of line replaceable units (LRUs). The LRUs may be a sink LRU or a source LRU. A source LRU is a source of power for a high voltage DC link (HVDC link) and a sink LRU uses the power from the HVDC link. The HVDC link may be used for propulsion. The EMS comprises one or more communication interfaces. The communication interfaces may be configured to receive status information from each of the source LRUs and sink LRUs. The status information may comprise information from respective sensors within the respective LRU and a determination that the information from each sensor is within a predetermined range. The communication interfaces may be used to transmit commands to the source LRUs and the sink LRUs. The EMS comprises redundant control paths for controlling safety critical operations. The redundant control paths are configured to independently determine whether to electrically isolate a LRU from the HVDC link based on the status information from the LRU. The isolation of a LRU is based on the independent determination.

The number of the redundant control paths and components may be depending on the type of the propulsion system. The aircraft may have one of a plurality of propulsion systems such as a parallel hybrid electric propulsion system, a parallel turbo electric propulsion system, an electric propulsion system, a turbo electric propulsion system and a turbo hybrid electric propulsion system.

In an aspect of the disclosure, the EMS may be configured to achieve less than a threshold probability of a catastrophic failure. For example, the threshold probability of a catastrophic failure may be $10^{-9}$.

In an aspect of the disclosure, the redundant control paths may also independently determine whether to electrically connect an LRU to the HVDC link.

BRIEF DESCRIPTION OF DRAWINGS

FIG. 2 illustrates an energy management system in a parallel turbo hybrid propulsion system in accordance with aspects of the disclosure;

DETAILED DESCRIPTION

Aspects of the disclosure provide an energy management system(s) (EMS) 10 which enables an aircraft's propulsion system to have a catastrophic failure probability rate of less than a predetermined threshold. The predetermined threshold may be a threshold required for the aircraft to meet a certification. In some aspects, the predetermined threshold is $10^{-9}$. In some aspects, the EMS 10 achieves this by using redundant control paths. The number of redundant control paths, the functionality achieved by the redundant control paths and control may be based on the type of propulsion architecture for the aircraft. The aircraft may be a conventional take off and landing aircraft (CTOL) or a vertical take off and landing (VTOL).

Figure 1:
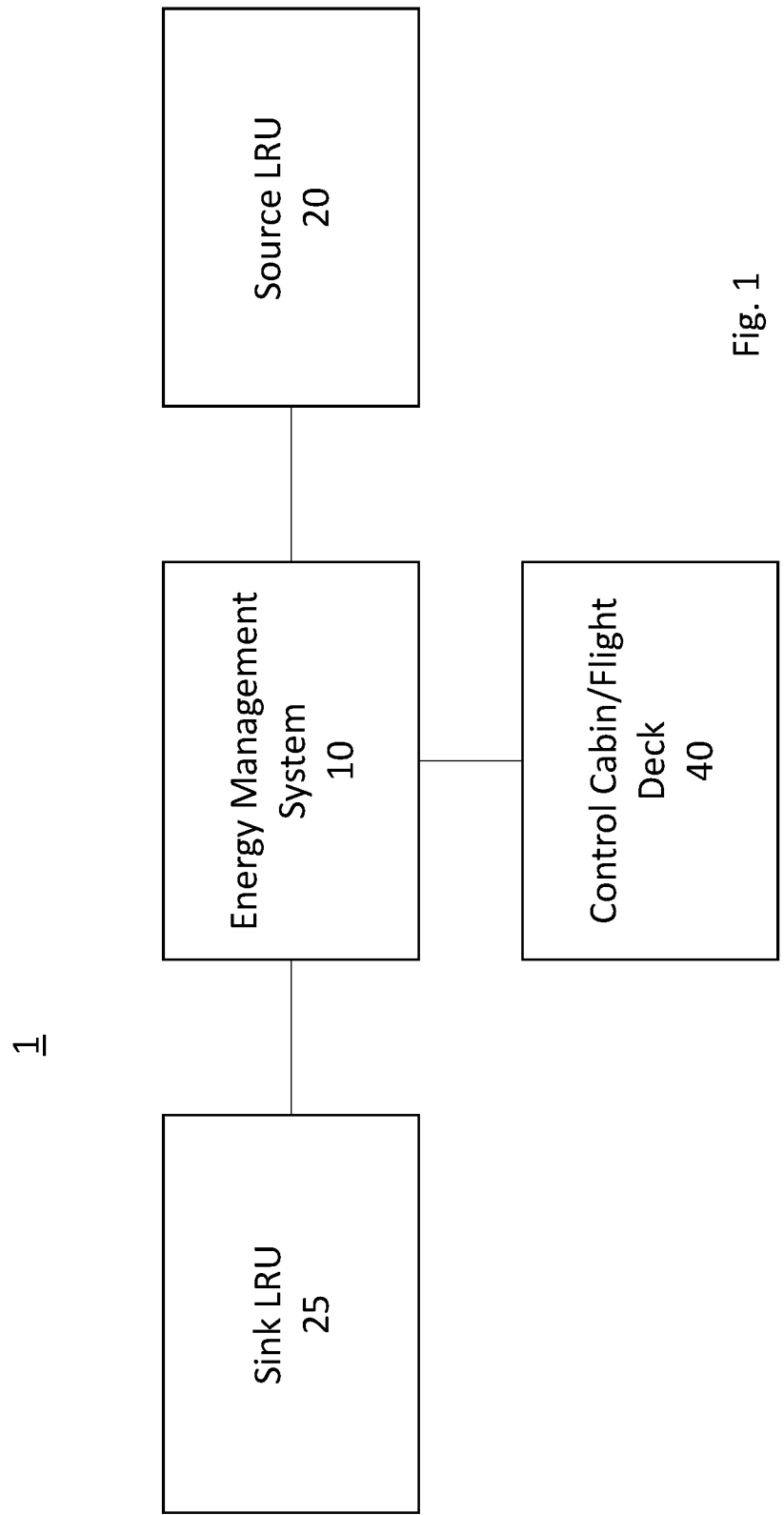
FIG. 1 illustrates a system in accordance with aspects of the disclosure.
Figure 3:
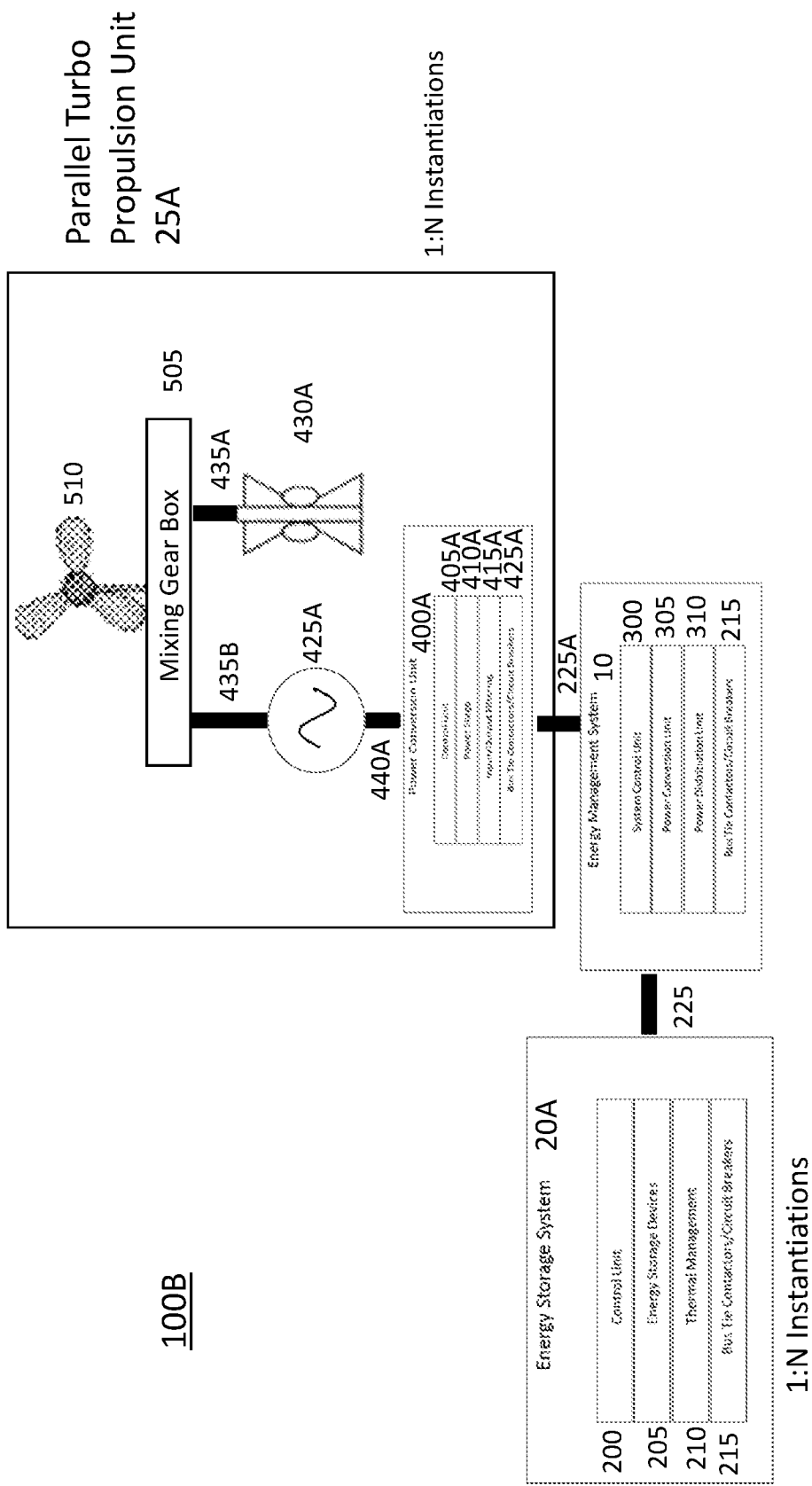
FIG. 3 illustrates an energy management system in a parallel hybrid electric propulsion system in accordance with aspects of the disclosure.
Figure 12:
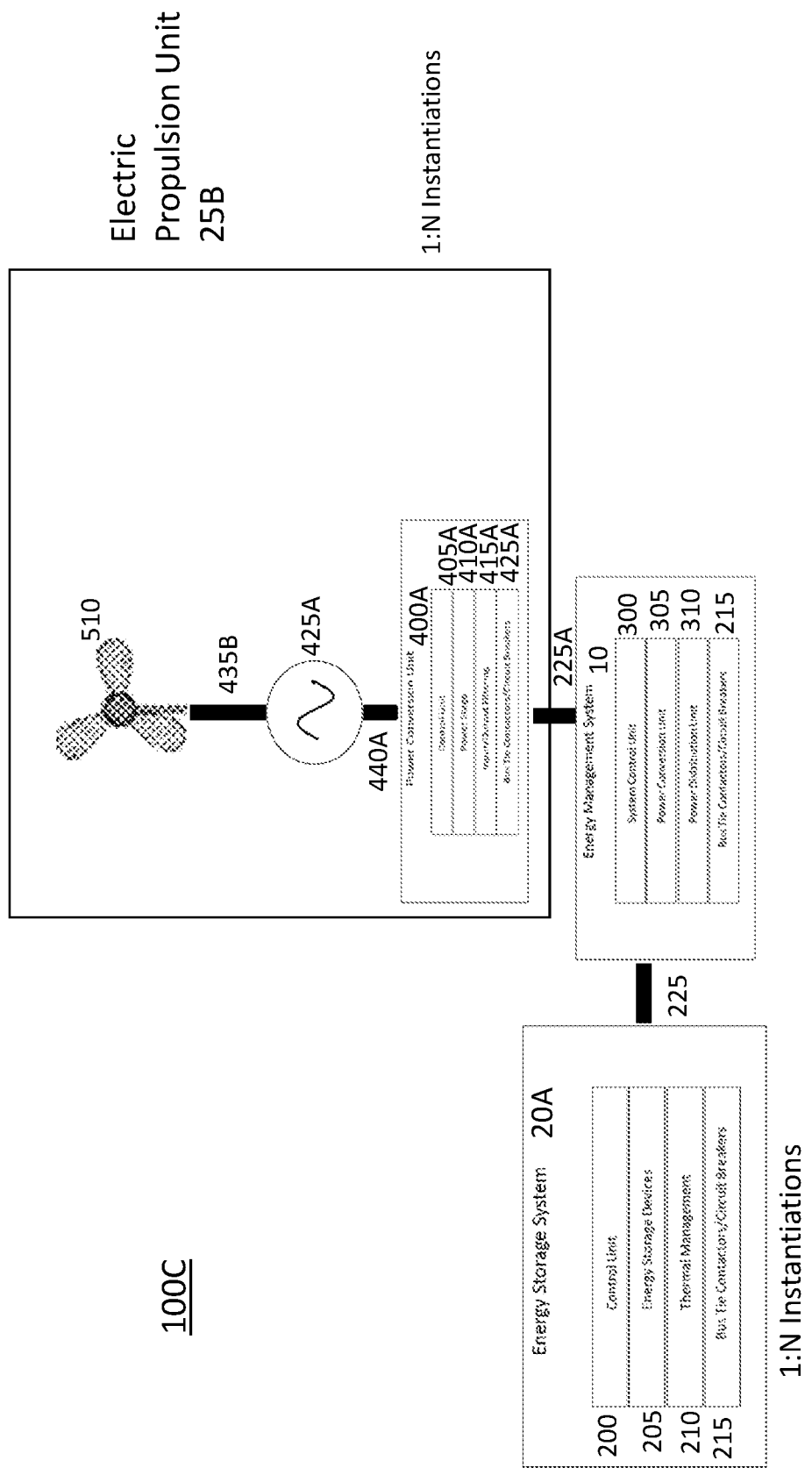
FIG. 12 illustrates an energy management system in an all electric propulsion system in accordance with aspects of the disclosure.
Figure 14:
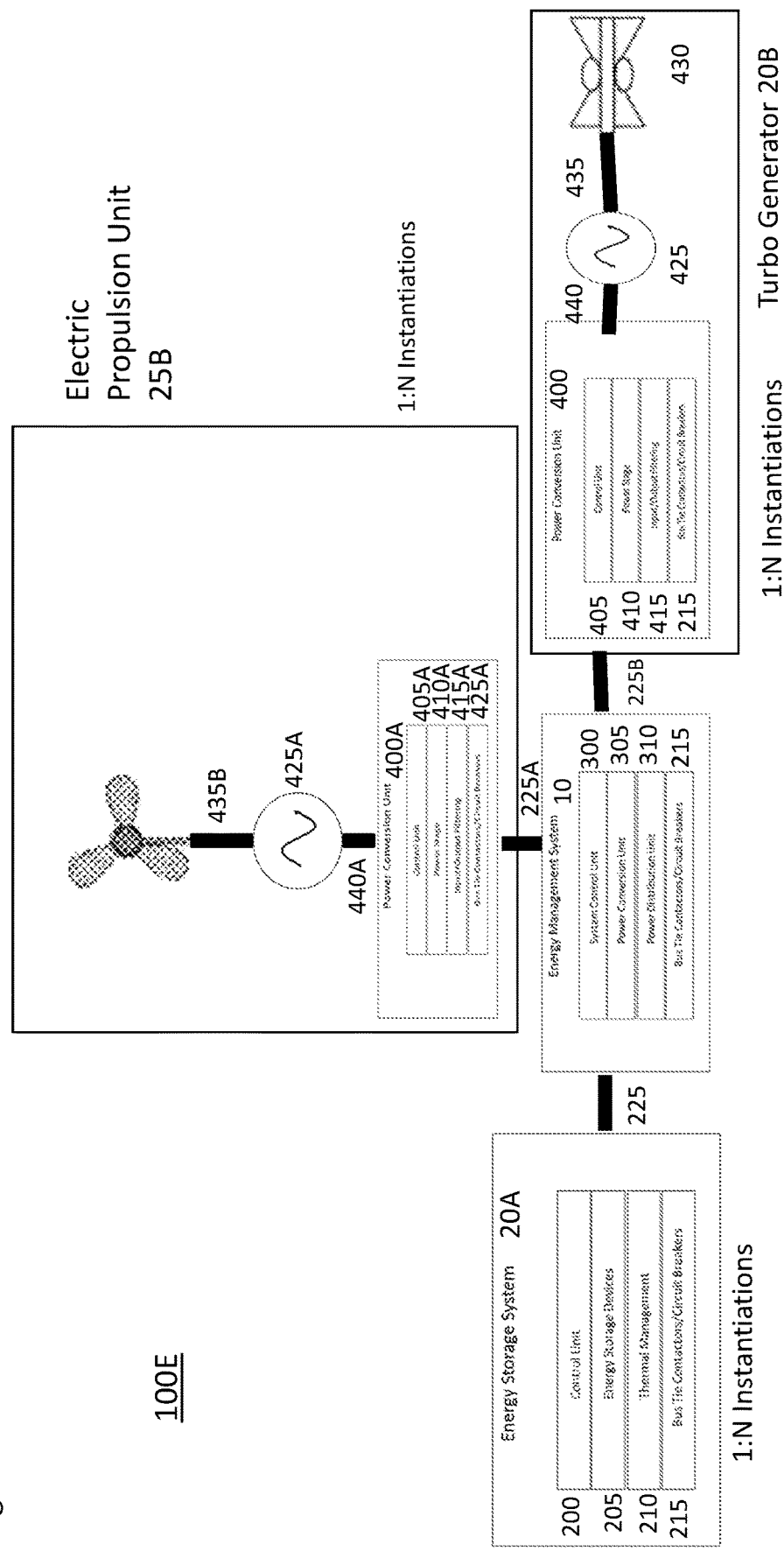
FIG. 14 illustrates an energy management system in a turbo hybrid electric propulsion system in accordance with aspects of the disclosure.
Figure 15:
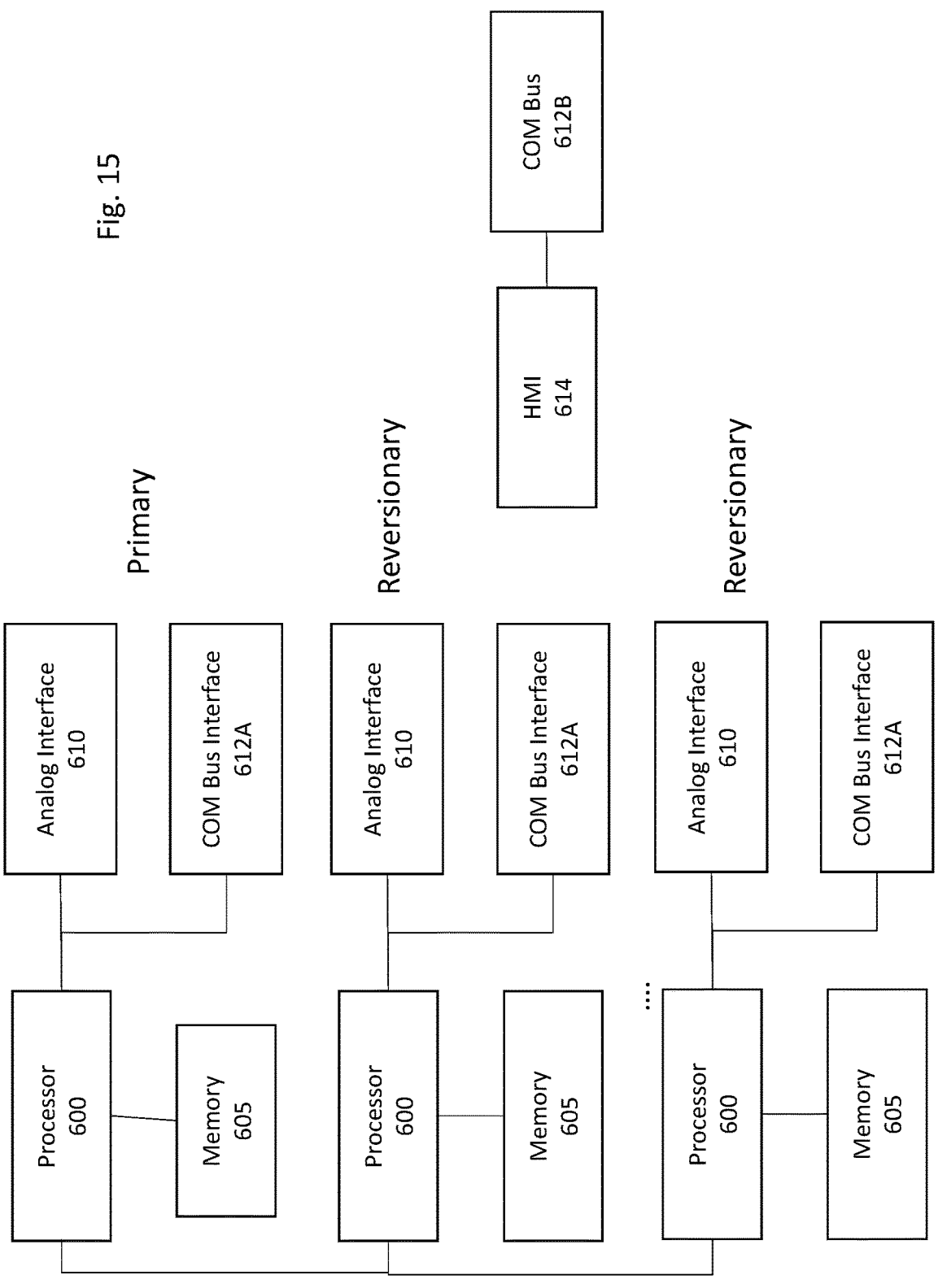
FIG. 15 illustrates a system control unit, federated or distributed, in accordance with aspects of the disclosure for the propulsion systems of FIGS. 12 to 14.
Figure 16:
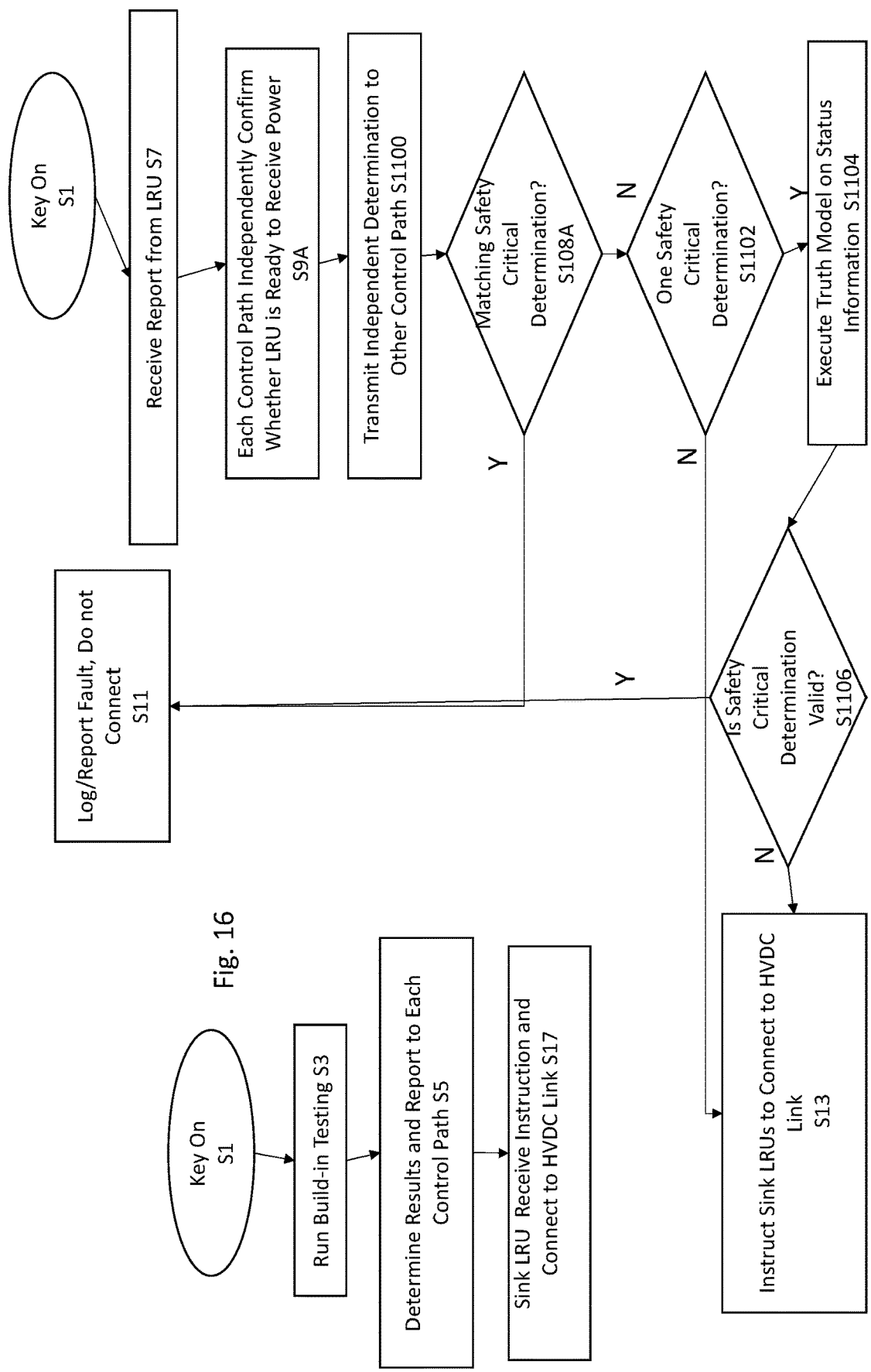
FIGS. 16 to 18 illustrate methods of management at key-on in accordance with aspects of the disclosure for the system control unit in FIG. 15.

The EMS 10 may be connected to a source Line replaceable units (Source LRUs 20) and sink line replaceable units (Sink LRUs 25). The type of source LRUs 20 may depend on the propulsion architecture for the aircraft. For example, a source LRU 20 may be an energy storage system (ESS) 20A such as in a parallel turbo hybrid propulsion system 100A (as illustrated in FIG. 2), parallel hybrid electric propulsion system 100B (as illustrated in FIG. 3), all electric propulsion system 100C (as illustrated in FIG. 12) and a turbo hybrid electric propulsion system 100E (as illustrated in FIG. 14).

An ESS 20A may comprise a control unit 200, energy storage devices 205, thermal management, bus tie contactors/circuit breakers 215 (also referred to contactors 215). The control unit 200 may comprise a microprocessor, a field programmable gate array (FPGA), a digital signal processor (DSP), application specific integrated circuits (ASIC), multi chip modules (MCM) or a combination of discrete logic (individually or collectively referred to herein as "a processor"). For example, the processor may comprise both a microprocessor and a FPGA. The microprocessor may comprise software to execute the functionality described herein. The microprocessor may also comprise a memory. Alternatively, the memory may be separate. The memory may comprise random access memory (RAM), read only memory (ROM), flash memory, etc. . . . . The control unit 200 may further comprise one or more interfaces such as analog interfaces and COM bus interfaces. The control unit 200 may further comprise other network interfaces such as an ETHERNET, serial such as ARINC 429, 422, 485 interfaces or a wireless interface. The interfaces may receive the key-on signal from a control cabin/flight deck 40. The interfaces may also be used to receive commands from the EMS 10 such as pre-charge command, open/close contactors or the circuit breakers 215, and commands to supply power to the high voltage DC link (HVDC 225A). The processor in the ESS 20A is configured to determine status information from one or more sensors in the ESS 20A. The status information for the ESS may comprise voltage, over voltage, under voltage, current, over current, under current, ground voltage, state of charge (SOC), delta SOC, temperature and other properties of the ESS. The processor may determine whether each property is within a predetermined range (this range may be stored in the memory). The processor may also be configured to transmit the status information to the EMS 10 at key-on and periodically in-flight. The processor in the ESS 20A may be configured to execute built in testing.

The processor may also be configured to respond to the commands from the EMS 10 such as to cause the contactors/circuit breakers 215 to open/close as needed, pre-charge the lines and supply power. The processor may also supply local bias power for the BIT.

The energy storage devices ESDs 205 provide direct current (DC) power to the HVDC 225A via the DC link 225 (and the EMS 10). The ESDs may be lithium ion batteries. The ESDs 205 may also alternatively or additionally include ultra-capacitors, lead-acid batteries, and other energy storage mediums. The ultra-capacitor may include an electric double-layer capacitor (EDLC), also known as a supercapacitor, supercondenser, or an electrochemical double layer capacitor, which has an electrochemical capacitor with relatively high energy density.

The power provided may be a first voltage 225 (DC link 225). The voltage may be the same or different from the voltage of the HVDC link 225A depending on the propulsion architecture for the aircraft and size of the aircraft and the mission.

In an aspect of the disclosure, the nominal voltage of the first voltage 225 is above 400 VDC. For example, the first voltage 225 may be 800 VDC.

The thermal management 210 may control the temperature of the ESS 20A to maintain the environment within a preset thermal environment, e.g., range, to achieve safe and optimal thermal conditions. In an aspect of the disclosure, the thermal management 210 may comprise liquid cooled plates, fans and pumps to move the liquid with pipes through the plates. The pipes may comprise one or more controllable valves to control the liquid through the pipes. These valves may be controlled via actuators. In an aspect of the disclosure, the processor in the ESS controls the actuators. In other aspects, the thermal management 210 may have its own processing elements, including microprocessors, FPGAs, and combinations thereof. Additionally, the ESS 20A may have other thermal cooling materials to maintain the temperature.

The bus tie contactors/circuit breakers 215 provide protections for the DC links 225, 225A, etc. The type of devices within the circuit may depend on the voltage of the DC links and the propulsion architecture. The contactors/circuit breakers 215 are designed for high voltage. High voltage used herein means a voltage greater than 50 VDC. The contactors may be thermal, electro-mechanical or solid-state. In other aspects, the contactors may be a combination thereof. Circuit breakers may be made of the above. In an aspect of the disclosure, both bus tie contactors and circuit breakers may be used. However, in other aspects, either may be used. In an aspect of the disclosure, the processor in the ESS 20A may control the bus tie contactors/circuit breakers 215 based on commands from the EMS 10. In other aspects, the bus tie contactors/circuit breakers 215 may have a dedicated processor such as the microprocessor or FPGA or combination thereof.

Figure 13:
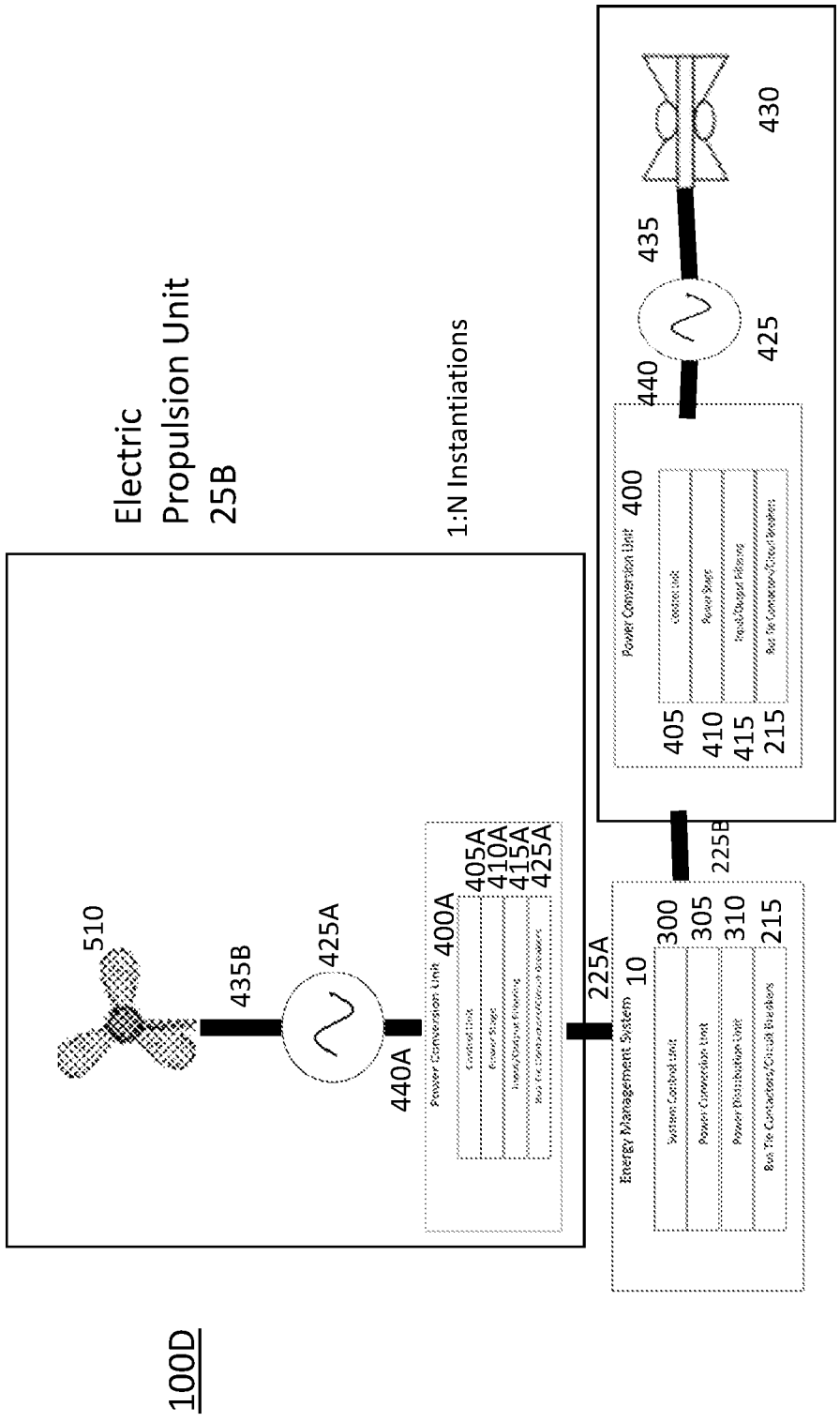
FIG. 13 illustrates an energy management system in an turbo electric propulsion system in accordance with aspects of the disclosure.

In other aspects, the source LRU 20 may also be a turbo generator 20B such as in a parallel turbo hybrid propulsion system 100A (illustrated in FIG. 2), an turbo electric propulsion system 100D (as illustrated in FIG. 13) and a turbo hybrid electric propulsion system 100E (as illustrated in FIG. 14). The turbo generator 20B may comprise a prime mover such as a turbo engine 430, a generator 425 and a power conversion unit (PCU) 400. The turbo engine 430 may receive fuel via fuel lines (not shown in the figures). The size and type of turbo engine 430 may depend on the airplane size, propulsion architecture and flight duration and application (mission). Additionally, the size and type of the turbo engine 430 may be based on the number of turbo generator 20B. The generator 425 may be permanent magnet generators such as surface permanent magnet generator or interior permanent magnet generator. However, other types of generators may be used such as wound-field, induction, synchronous reluctance (SynR), axial flux machines and switched reluctance generators. The types of generators used are not limited to the above an other machines suitable to convert mechanical motion into electrical energy may be used. The generator 425 is connected to an output shaft 435 of the turbo engine. The generator 425 may provide three-phase AC 440 to the power conversion unit 400.

The PCU 400 may comprise a control unit 405, a power stage 410, an input/output filtering 415 and the bus tie contactors/circuit breakers 215.

The control unit 405 may comprise a processor as described above. For example, the processor may comprise a combination of a microprocessor and a FPGA. The microprocessor may comprise software to execute the functionality described herein. The microprocessor may also comprise a memory. Alternatively, the memory may be separate. The memory may comprise random access memory (RAM), read only memory (ROM), flash memory, etc. . . . . The control unit 405 may further comprises one or more interfaces such as analog interfaces and COM bus interfaces. The control unit 405 may further comprise other network interfaces such as an ETHERNET, serial bus such as ARINC 429, 422, 485 interfaces or a wireless interface. The interfaces may receive the key-on signal from a control cabin/flight deck 40. The interfaces may also be used to receive commands from the EMS 10 such as open/close contactors or the circuit breakers 215, and commands to supply power to the high voltage DC link 225A. The processor in the PCU is configured to determine status information from one or more sensors in the PCU 400. The status information for the PCU may comprise voltage, over voltage, under voltage, current, over current, under current, ground voltage, state of charge (SOC), delta SOC, temperature and other properties of the PCU. The processor may determine whether each property is within a predetermined range (the range may be stored in the memory). The processor may also be configured to transmit the status information to the EMS 10 at key-on and periodically in-flight. The processor in the PCU also controls the generator 425 to provide power based on commands from the EMS 10 for propulsions. The manner in which the generator 425 is controlled may depend on the type of generator 425. For example, the control may be field oriented control, space vector modulating or dead beat control.

The power stage 410 may comprise circuitry (inverter) to convert the AC power 440 received from the generator 425 into the power for the DC link 225B. In an aspect of the disclosure, the circuitry may comprise high power semiconductor switching devices such as metal oxide field effect transistors (MOSFETs), insulated gate bi-polar transistors (IGBT), high electron mobility transistors (HMET) or thyristors. The semiconductors may comprise silicon, silicon carbide, gallium nitride and/or other materials. In some aspects, the switching devices may be arranged in a single level, 2-level or multilevel configuration The power stage 410 may also comprise drive circuitry to bias the switching elements. The processor in the turbo generator 20B may be configured to execute built in testing.

The power stage 410 may also comprise the above references sensors (voltage, current, temperature, etc).

The input/output filtering 415 is configured to filter the output of the power stage 410 to increase the quality of the power. The filtering 415 may comprise one or more capacitors C and inductors L for an LC filter. In other aspects, the filtering 415 may include or instead have one or more diodes D.

Similar bus tie contactors/circuit breakers 215 may be used in the turbo generator 20B.

The number of ESS 20A and turbo generators 20B may be based on the application such as the size of the aircraft and mission dependent parameters such as speed, length of flight, maneuvers, etc.

The sink LRUs 25 may be a parallel turbo propulsion unit 25A such as in a parallel turbo hybrid propulsion system 100A (as illustrated in FIG. 2) or parallel hybrid electric propulsion system 100B (as illustrated in FIG. 3). The parallel turbo propulsion unit 25A may comprise a turbo engine 430A, a motor 425A, a PCU 400A, a mixing gear box 505 and a propulsion fan 510. In a parallel turbo propulsion units 25A two mechanical shafts 435A (from engine 430A) and 435B (from motor 425A) are connected to the fan 510 via a mixing gear box 505. The mixing gear box 505 enables the speeds of the mechanical shafts 435A/435B to be properly combined via gear ratios to achieve the speed for the fan 510.

The motor 425A may be a similar electric machine as described above such as permanent magnet such as surface permanent magnet or interior permanent magnet. However, other types of electric machines may be used such as wound-field, induction, synchronous reluctance (SynR), axial flux machines and switched reluctance. The types of motors used are not limited to the above and other machine suitable to convert electrical energy (AC power 440A) into mechanical motion may be used.

The PCU 400A in a parallel turbo propulsion unit 25A is similar to a PCU 400 in the turbo generator 20B in that it comprises a control unit 405A, a power stage 410A, a input/output filtering 415A and a bus tie contactors/circuit breakers 425A. Since the HVDC links 225A may be higher than DC links 225 and 225B, the bus tie contactors and breakers 425A may need to be designed for a higher rating.

The control unit 405A may comprise a processor as described above. For example, the processor may be a combination of a microprocessor and a FPGA. The microprocessor may comprise software to execute the functionality described herein. The microprocessor may also comprise a memory. Alternatively, the memory may be separate. The memory may comprise random access memory (RAM), read only memory (ROM), flash memory, etc. . . . . The control unit 405A may further comprises one or more interfaces such as analog interfaces and COM bus interfaces. The control unit 405A may further comprise other network interfaces such as an ETHERNET, serial such as ARINC 429, 422, 485 interfaces or a wireless interface. The interfaces may receive the key-on signal from a control cabin/flight deck 40. The interfaces may also be used to receive commands from the EMS 10 such as open/close contactors or the circuit breakers 425A, and command to supply mechanical power to the fan 510 using the HVDC link 225A. The processor in the PCU is configured to determine status information from one or more sensors in the PCU 400A. The status information for the PCU may comprise voltage, over voltage, under voltage, current, over current, under current, ground voltage, state of charge (SOC), delta SOC, temperature and other properties of the PCU. The processor may determine whether each property is within a set range. The processor may also be configured to transmit the status information to the EMS 10 at key-on and periodically in-flight. The processor in the PCU also controls the motor 425A to provide mechanical power based on commands from the EMS 10 for propulsion. The manner in which the motor 425A is controlled may depend on the type of motor 425A. For example, the control may be field oriented control, space vector modulating or dead beat control.

The power stage 410A may comprise circuitry (inverter) to convert the HVDC link 225A received into the AC power 440A for the motor 425A. The circuitry may be similar to described above but reversed.

The sink LRUs 25 may be an electric propulsion unit 25B such as in an all electric propulsion system 100C (as illustrated in FIG. 12), a turbo electric propulsion system 100D (as illustrated in FIG. 13) and a turbo hybrid electric propulsion system 100E (as illustrated in FIG. 14). The electric propulsion unit 25B is similar to the parallel turbo propulsion unit 25A except the turbo engine 430A (and shaft 435A) and mixing gear box 505 is removed. The shaft 435B from the motor 425A may be directly connect to the fan 510 or indirectly connected through gear box (not shown).

Once again, the number of parallel turbo propulsion units 25A or electric propulsion units 25B may be based on the application such as the size of the aircraft and mission dependent parameters such as speed, length of flight, maneuvers, etc.

The use of the propulsion architectures described herein saves fueling cost per flight. For example, 30-70% less fuel may be used. Additionally, the use of the architectures results in a dramatic reduction in emissions which enables new routes and markets that were not previously economically viable. Additionally, the propulsion architectures enable air framers to maximize the efficiency of air travel by the placement of certain LRUs within the system in a more aerodynamically advantageous locations.

For example, the use of a parallel turbo hybrid propulsion system 100A (as illustrated in FIG. 2) may be able to achieve an optimal fuel burn rate to produce a net decrease of 20-40% fuel consumption even where routes are extended further than an ESS 20A can handle. This is because the sources include both the turbo generator 20B and the ESS 20A. Additionally, a net decrease of 50-70% in fuel consumption may be achieved due to the efficiency in controlling the combination of sources. Moreover, since there may be multiple parallel turbo propulsion units (Distributed propulsion), power may be optimally provided to achieve the desired performance from the control cabin 40. In the case of all electric propulsion 100% fuel burn savings is achieved.

Figure 4:
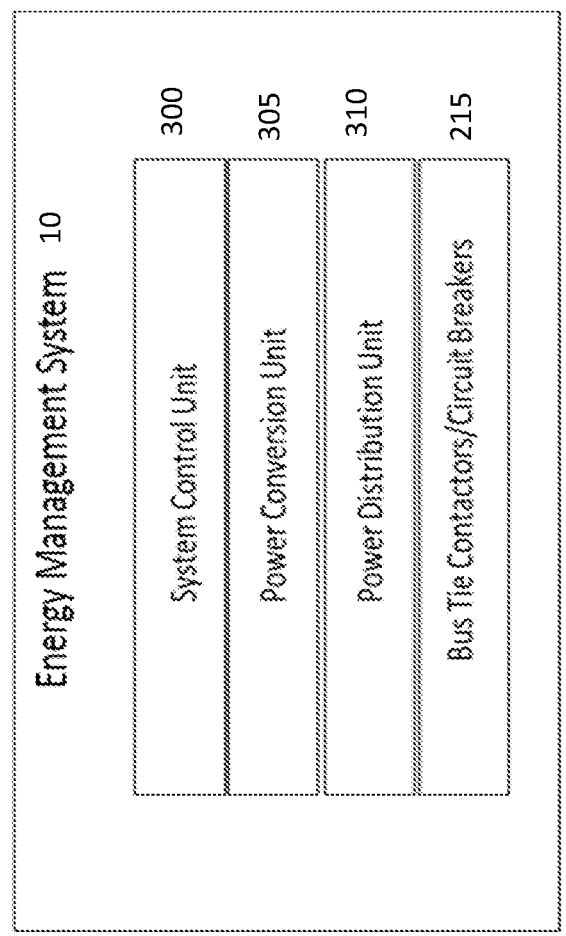
FIG. 4 illustrates an energy management system in accordance with aspects of the disclosure.

FIG. 4 illustrates an EMS 10 in accordance with aspects of the disclosure. The EMS 10 comprises system control unit (SCU) 300, a power conversion unit 305, a power distribution unit 310 and bus tie contactors/circuit breakers 215.

Figure 5:
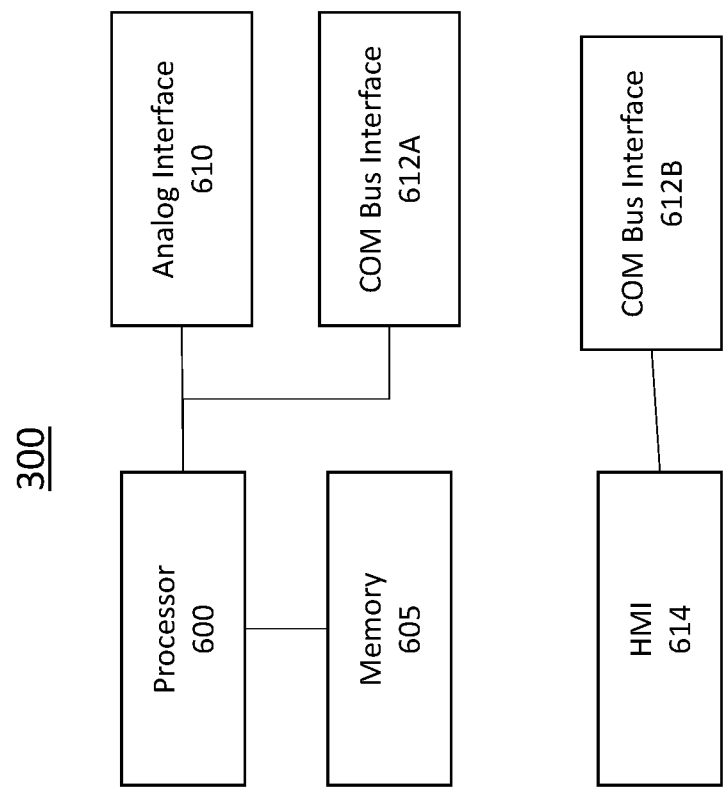
FIG. 5 illustrates a distributed system control unit in accordance with aspects of the disclosure for the energy management system in FIGS. 2 and 3.

In an aspect of the disclosure, the EMS 10 may be implemented as a distributed control. FIG. 5 illustrates an example of the SCU 300 with distributed control. In the SCU 300 illustrated in FIG. 5, there are two control paths where one of the control paths is via the control cabin 40. In an aspect of the disclosure, the control cabin 40 comprises a human-machine interface (HMI) 614. The HMI 614 may comprise a display, a means for receiving a command from a pilot or a user and a processor. The display may be screen on a panel of the control cabin. The display may also be a heads-up display or a head-mounted display. The display may display status information from the LRUs 20, 25. The status information may be transmitted directly from the LRU, 20, 25 to the HMI 614 via a COM bus interface 612B. The transmission/reception of the status information is not limited to being via COM bus interface 612B. For example, the status information may be transferred via analog interfaces. The pilot or user may use the means for receiving a command to instruct an LRU, 20, 25 to open a contactor or breaker 215, 425A to disconnected from the HVDC link 225A. For example, the pilot or user may view the status information and determine the fault in a LRU is related to a safety critical issue and remove the LRU from the HVDC link 225A.

In response to the receipt of this command, a processor in the HMI 614 relays the command to the appropriate LRU to open the contactor or breaker 215, 425A to disconnected from the HVDC link 225A.

The means for receiving a command may be a touch panel on the display, push button or switch.

The second control path may comprise a processor 600, a COM bus interface 612A and an analog interface 610. As depicted, the second control path may also comprise a memory. In an aspect of the disclosure, the processor may be a combination of elements including software running on hardware, hardware in firmware. As described above, a processor 600 may include a microprocessor, a FPGA, DSP, ASIC, MCM or analog circuitry. In an aspect of the disclosure, the processor may be a combination of a microprocessor and an FPGA. The memory 605 may comprise random access memory (RAM), read only memory (ROM), flash memory, etc.

The analog interface 610 may be configured to receive a key-on signal from the control cabin 40. The COM bus interface 612A may receive the status information from the LRUs, 20, 25. In other aspects, the status information may be received by the analog interface(s).

Figure 6:
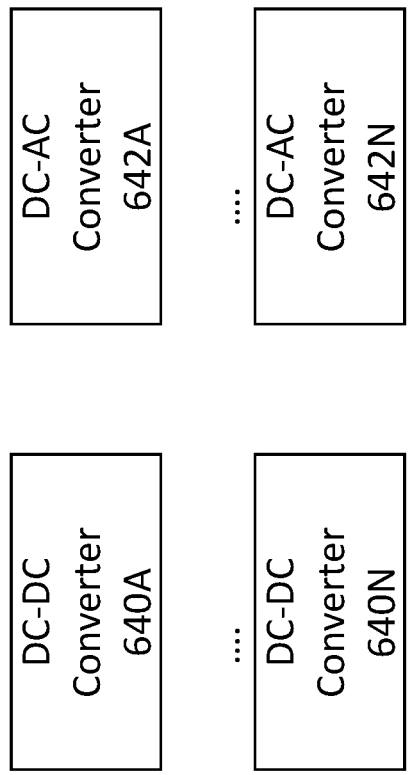
FIG. 6 illustrates a power conversion unit in accordance with aspects of the disclosure.

FIG. 6 illustrates an example of the power conversion unit 305. The power conversion unit 305 may comprise a plurality of DC-DC converters 640A-640N. One of the converters may be used to convert the DC voltage (first voltage 225) to VDC for the HVDC link 225A. This converter may be a boost-buck converter. This may be used when the voltages from HVDC link 225A is higher than the first voltage 225 supplied by the ESS 20A. Another DC-DC converter (or the same) may be used to converter the voltage on DC link 225B to the HVDC link 225A. In an embodiment, the voltage 225 is the same as voltage 225B.

In other aspects, different DC-DC converters may be used to supply local bias voltages for the hardware such as for the processors and to bias switches. The source of the bias voltage may be in the control cabin or a low voltage DC battery. In an aspect of the disclosure, the DC-DC converters in the EMS 10 may provide the local bias voltages for the hardware in the LRUs 20, 25 at key-on. In other aspects, each LRU has its own DC-DC converter to supply the local bias voltages.

In other aspects, the EMS 10 may have DC-DC converters to provide DC power to accessories. The DC accessories may comprise lighting and radio.

In other aspects, the power conversion unit 305 may comprise DC-AC converters 642A-642N (e.g., inverters). These inverters may be used to supply AC power to AC accessories. The AC accessories are typically motor driven. Thus, the EMS 10 is coupleable to the motors for the associated accessories. For example, the AC accessories may comprise air compressors and air condition compressors. The phrase "AC accessories" used herein also refers to the sub-systems required for the accessory to function.

The power distribution unit 310 may comprise a plurality of connection terminals and cabling. The connection terminals are configured to receive connector cables for electrically connecting the LRUs, 20, 25 to the EMS 10. The power distribution unit 310 may be distributed in the aircraft and separated as needed to route the cables from a LRU to another LRU via the EMS 10.

While the SCU 300 illustrated in FIG. 5 provides redundant control paths, the redundant control paths may not be used for each control instance. For example, in an aspect of the disclosure, when key-on is received, both control paths may not be used to determine whether to connect an LRU to the HVDC link 225A.

Figure 7:
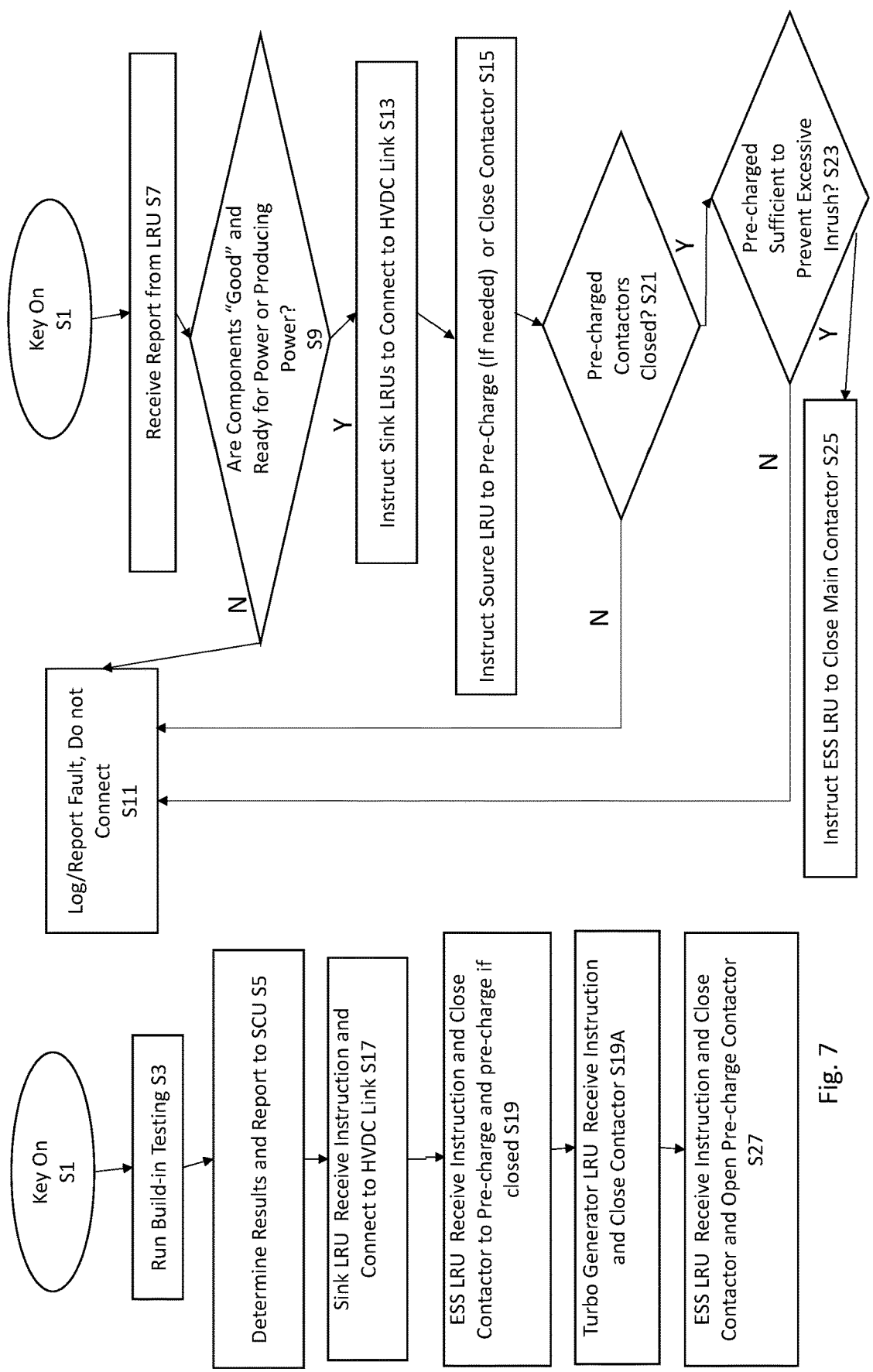
FIG. 7 illustrates a method of management at key-on in accordance with aspects of the disclosure for the distributed system control unit in FIG. 5.

FIG. 7 illustrates a method of responding to a key-on signal from a control cabin 40 in accordance with aspects of the disclosure for the architecture illustrated in FIGS. 2 and 3.

At S1, each LRU 20, 25 and the EMS 10 receives a key-on signal from the control cabin 40. The key-on signal may be transmitted via analog interface(s). The key-on signal may be received with DC power to bias certain circuitry needs to run built-in testing (BIT) and communicate with the EMS 10 and vice versa.

At S3, each LRU 20, 25 runs its respective BIT. In the BIT, sensors within the LRU 20, 25 report the sensed/detected values to the respective processor. In an aspect of the disclosure, the respective processor in the control units 200 and 400A (and 400 depending on the architecture), determine whether the sensed values are within predetermined ranges, respectively. The predetermined range for each sensed parameter may be stored in the respective memory in each LRU, 20, 25. When the sensed parameters are outside the predetermined range, the LRU 20, 25 adds a fault determination to status information (e.g., fault=yes). The status information may include a fault determination and the raw sensed values from the sensor(s), respectively. In other aspects, the processor in the control units 200 and 400A (and 400 depending on the architecture) may calculate additional information based on the sensed values and add the calculated additional information to the status information. At S5, each LRU 20, 25 transmits the status information to the EMS 10 (SCU 300) via the COM bus interface. At S7, the processor 600 (in the SCU 300) receives the report containing the status information from each LRU 20, 25. For each LRU 20, 25, the processor 600 determines, from the status information, whether the LRU 20, 25 is ready at S9 (e.g., either to receive power or produce power). In an aspect of the disclosure, if a processor in the control unit of an LRU determines that a fault exists, the processor 600 determines that the LRU is not ready to receive power or provide power at S9 (N at S9) and does not issue a command to close the contactors 215/425A and generates a report indicating a fault and logs the report in the memory at S11.

On the other hand, when there is no fault in a sink LRU 25, the processor 600 issues a command to the sink LRU 25, to close the contactor 425A to the HVDC link 225A at S13. Also, when there is no fault in a source LRU 20 and the source LRU 20 is a LRU that needs to be precharged such as ESS 20A, the processor 600 may issue a command to the ESS 20A to pre-charge at S15. When the source LRU 20 does not need to be precharged such as turbo generator 20B (if included in the architecture), the processor 600 may issue a command to the turbo generator 20 to close the contactor 215 which electrically connects the same to the HVDC link 225A (via the EMS 10). The EMS may also close its contactors 215/425A. The above commands may be issued via the COM bus interface 612A.

At S17, a sink LRU 25 receives the command and the processor in the control unit 405A causes the contactors 425A to close to connect the LRU 25 to the HVDC link 225A.

At S19A, the turbo generator 20B (if included in the architecture) receives the command and processor in the control unit 405 causes the contactors 215 to close to connect the LRU 25 to the HVDC link 225A (via the EMS 10).

At S19, the ESS 20A receives the command to pre-charge. In an aspect of the disclosure, a ESS 20A has pre-charge circuitry. This pre-charge circuitry may comprise a contactor in parallel with an in-rush resistor. In response to receipt of the command, the processor in control unit 200 causes the contactor to close. In this aspect, sensors on both sides of the contactor measure current/voltage. The sensed values may be used to determine whether the DC link 225 is sufficiently pre-charged.

At S21, the processor 600 determines if the ESS 20A has closed its pre-charge contactors. In an aspect of the disclosure, voltage and current sensors may be used for this determination. In an aspect of the disclosure, the processor in the control unit 200 may report the sensed values to the processor 600. If the processor 600 determines that the pre-charge contactors not closed (remain open) (N at S21), the ESS 20A is not connected to the HVDC link 225A and a report indicating a fault is logged at S11. When the pre-charged contactors are closed, the processor 600 waits to instruct the ESS 20A to close the main contactors 215 until the pre-charge reaches a predetermined condition. In an aspect of the disclosure, the predetermined condition may be a steady state voltage, e.g., balanced voltage. In other aspects, the predetermined condition may be current based.

At S23, the processor 600 using the sensed values may determine whether the predetermined condition is satisfied. When there is sufficient pre-charge (Y at S23), the processor 600 issues a command to the processor in the control unit 200 to open the pre-charge contactor and close the main contactor 215 (at S25). When pre-charge is not sufficient (and after a preset period of time has lapsed), the processor 600 maintains the main contactor 215 opened and generates a report indicating a fault at S11.

At S27, the processor in the control unit 200 receives the command and opens the pre-charge contactor and closes the main contactor 215. If the main contactor 215 is not closed, the processor 600 generates a report indicating a fault at S11. The report may contain a timestamp.

Figure 8:
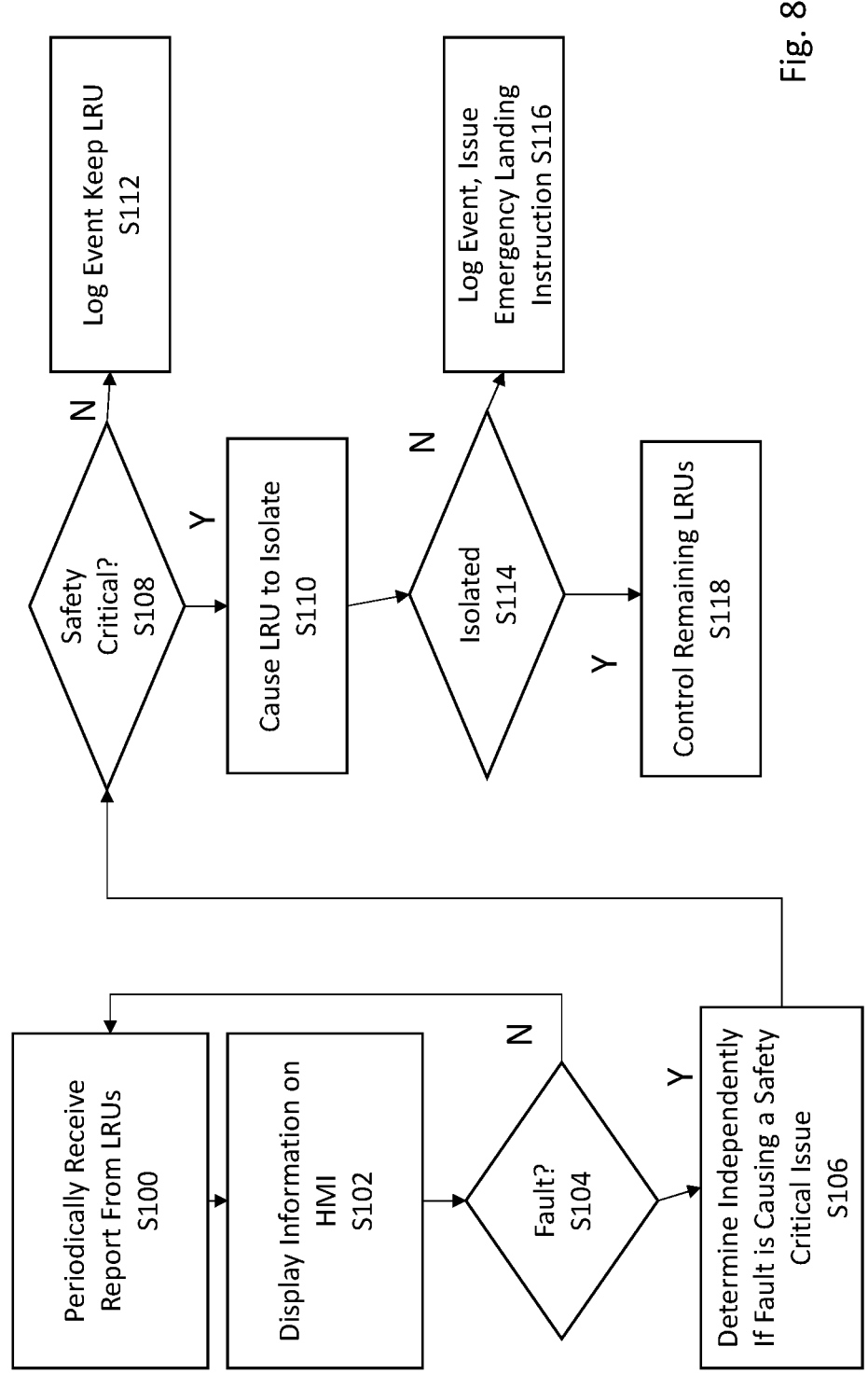
FIG. 8 illustrates a method of in-flight management of Line replaceable units connection in accordance with aspects of the disclosure for the distributed system control unit in FIG. 5.

FIG. 8 illustrates an example of a redundant control of the connection status of LRUs 20, 25 during the in-flight operation of the aircraft.

At S100, each control path receives a report from each LRU 20, 25. The report is periodically received. The report contains the sensed values from the sensors and determination by the respective processors of a fault, e.g., sensed value out of predetermined range. The report(s) are received by the processor 600 and the HMI 614 via respective COM bus interfaces 612A, 612B.

At S102, the status information (determination and raw sensed data) may be displayed on a display of the HMI. At S104, each control path independently confirms/determines whether a LRU 20, 25 has a fault. For example, the processor 600 determines whether the report indicates a fault has been determined; additionally, the processor 600 may also compare the sensed values with the predetermined ranges for the parameters (the predetermined ranges may also be stored in the memory in the EMS 10). Additionally, the pilot viewing the display of the HMI can recognize the fault determination. In an aspect of the disclosure, the display may use a different color or indication of a sensed value which is out of the predetermined range. When there is no fault (N at S104), the control paths return to S100. In contrast, when there is a fault (Y at S104), each control path independently determines whether the fault may or is causing a safety critical issue at S106. Safety critical issue is the possibility of imminent danger to life and health of a person. The processor 600 may determine safety critical issue based on the magnitude of the value which is out of range or combination of values. The processor 600 may have a look up table defining safety critical issues based on the sensed output. The pilot may also view the sensed values on the display and determine that the fault is causing or will cause a safety critical issue. If either control path determines that there is a safety critical issue with an LRU 20, 25 (Y at S108), the LRU may be isolated from the HVDC link 225A. For example, either or both the HMI 614 and/or the processor 600 may issue a command to the LRU 20, 25 to open the contactor 215/425A at S110. The command may be sent via the respective COM bus 612A, 612B.

If the fault is not causing a safety critical issue (N at S108), the processor 600 generates a report indicating a fault condition and logs the same at S112.

In an aspect of the disclosure, safety critical may also be determined by examining the aircraft performance, such as change in trajectory, speed, high, etc.

At S114, the processor 600 (and HMI 614) monitor and determine whether the safety critical fault LRU has been isolated from the HVDC link 225A by verifying the contactors/circuit breakers are open utilizing the appropriate sensors. If it is determined that the safety critical fault LRU has been isolated (Y at S114), then the processor 600 continues to control the remaining LRUs based on propulsion command from the control cabin 40 at S118.

If it is determined that the safety critical fault LRU cannot be isolated (contactors 215/425A) are not opened, the processor 600 may issue a command to the control cabin 40 via the COM bus 612A for an emergency landing at S116. The processor 600 may also generate a report with the event at S116.

Figure 9:
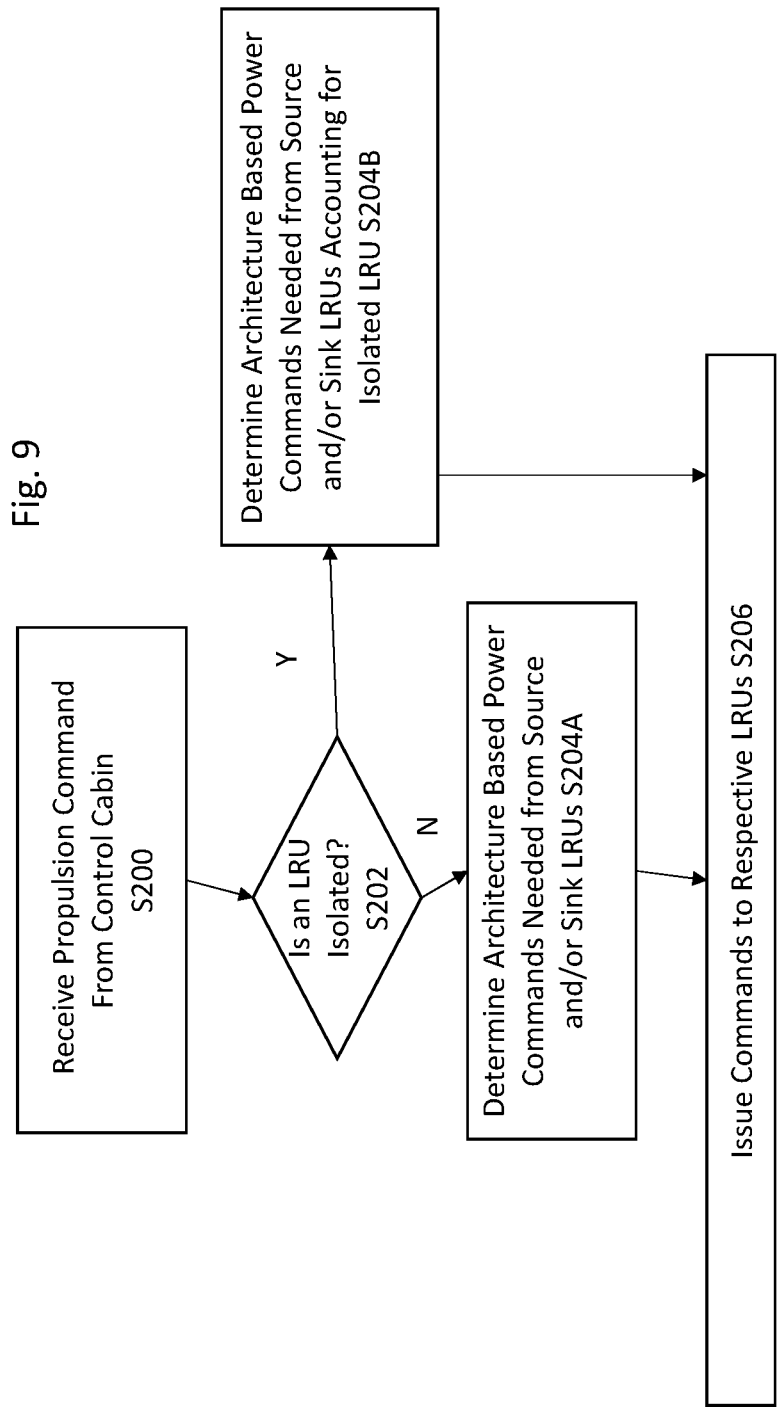
FIG. 9 illustrates a method of in-flight management in response to receiving commands from a control cabin in accordance with aspects of the disclosure for the distributed system control unit in FIG. 5.

FIG. 9 illustrates an example of a method for responding to propulsion commands from the control cabin 40 in accordance with aspects of the disclosure.

At S200, the processor 600 may receive a propulsion command from the control cabin 40. The propulsion command may be a power command, a torque command or a speed command. The command may include a vector such as direction. At S202, the processor 600 may determine whether there is an LRU 20, 25 that has been isolated due to a fault. This is because the EMS 10 may control LRUs to account for the isolated LRU, e.g., adjust "a normal command" as needed to maintain the desired performance while achieving a Minimum aerodynamic integrity at 5204B.

When there is no LRU 20, 25 which is isolated, e.g., fully connected LRUs, the processor 600 executes architecture and aircraft based-control logic to determine the appropriate control commands to issue to each LRU 20, 25 at S204A. The control commands may also be speed, torque or power commands as needed to achieve the minimum aerodynamic integrity. In an aspect of the disclosure, the control commands may be different for parallel turbo hybrid propulsion system 100A or the parallel hybrid propulsion system 100B. The specific control logic may also be aircraft specific and customized by a manufacture of the aircraft.

When there is an LRU 20, 25, which is isolated, the processor 600 executes architecture and aircraft based-control logic to determine the appropriated control commands to issue to each LRU 20, 25 while boosting power/propulsion from the remaining LRUs as needed at S204B.

The amount of the boost and which LRUs are boosted may also be architecture and aircraft specific to achieve the desired propulsion commanded from the control cabin 40.

At S206, the processor 600 issues the determined commands (either at S204A or S204B) to the LRUs 20, 25 which are connected to the HVDC link 225A.

Figure 10:
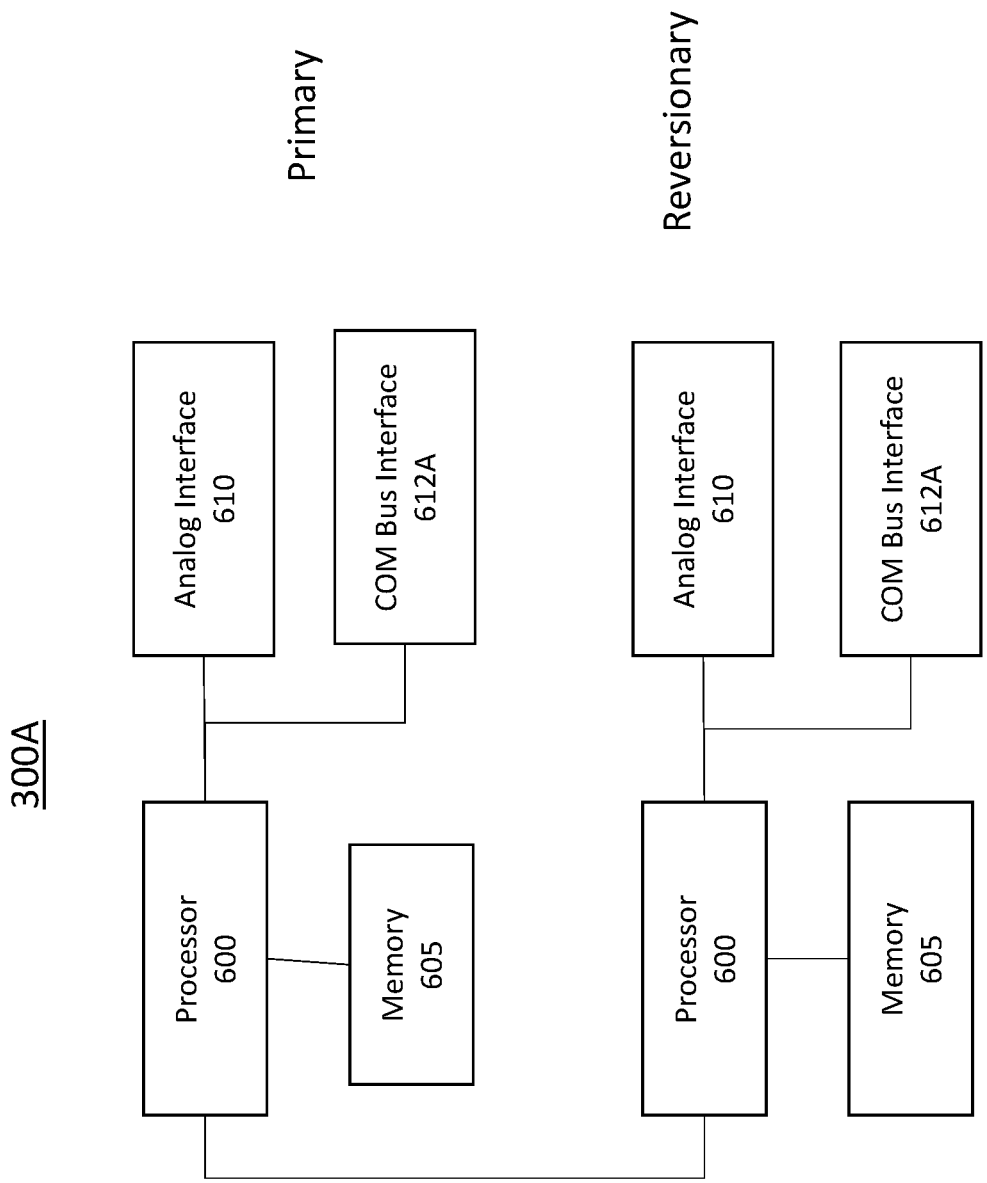
FIG. 10 illustrates another a system control unit, either federated or distributed, in accordance with aspects of the disclosure for a propulsion system in FIGS. 2 and 3.

FIG. 10 illustrates another SCU 300A for the EMS 10 in accordance with aspects of the disclosure. In SCU 300A, HMI is not shown, and the redundant control paths comprise a primary control path and a reversionary control path. In an aspect of the disclosure, control via the HMI, as described above, may also be included.

In SCU 300A, each control path may comprise the processor 600, memory 605, analog interface and COM bus interface 612A. In an aspect of the disclosure, the primary control path further comprises a truth model. The truth model may be stored in the memory 605 and executed by processor 600. The truth model is a mapping of sensor outputs to a valid fault/no-fault determination. In another aspect of the disclosure, the truth model may be execute alternatively in the processor 600 in the reversionary path. In another aspect of the disclosure, the truth model may be executed in the primary and the reversionary control paths. In yet another aspect of the disclosure, the truth model may only be executed in a separate and independent processor (not shown in FIG. 10). The primary control path is configured to take in commands from the control cabin 40 and issue command to the LRUs, 20, 25 and receive status information from the LRU 20, 25 and control the LRUs based on the same. The revisionary control path is configured to take in the commands from the control cabin 40 but not issue commands to the LRUs 20, 25 unless the primary control path faults. The revisionary control path is also configured to receive the reports from the LRUs and determine whether a safety critical fault occurred, but not issue a command to isolate the LRU unless the primary control path faults.

Each processor 600 may respectively communicate with the other processor(s) 600.

Once again, the redundant control paths may not be used at key-on. However, in other aspects, the redundant control paths may be used.

Figure 11:
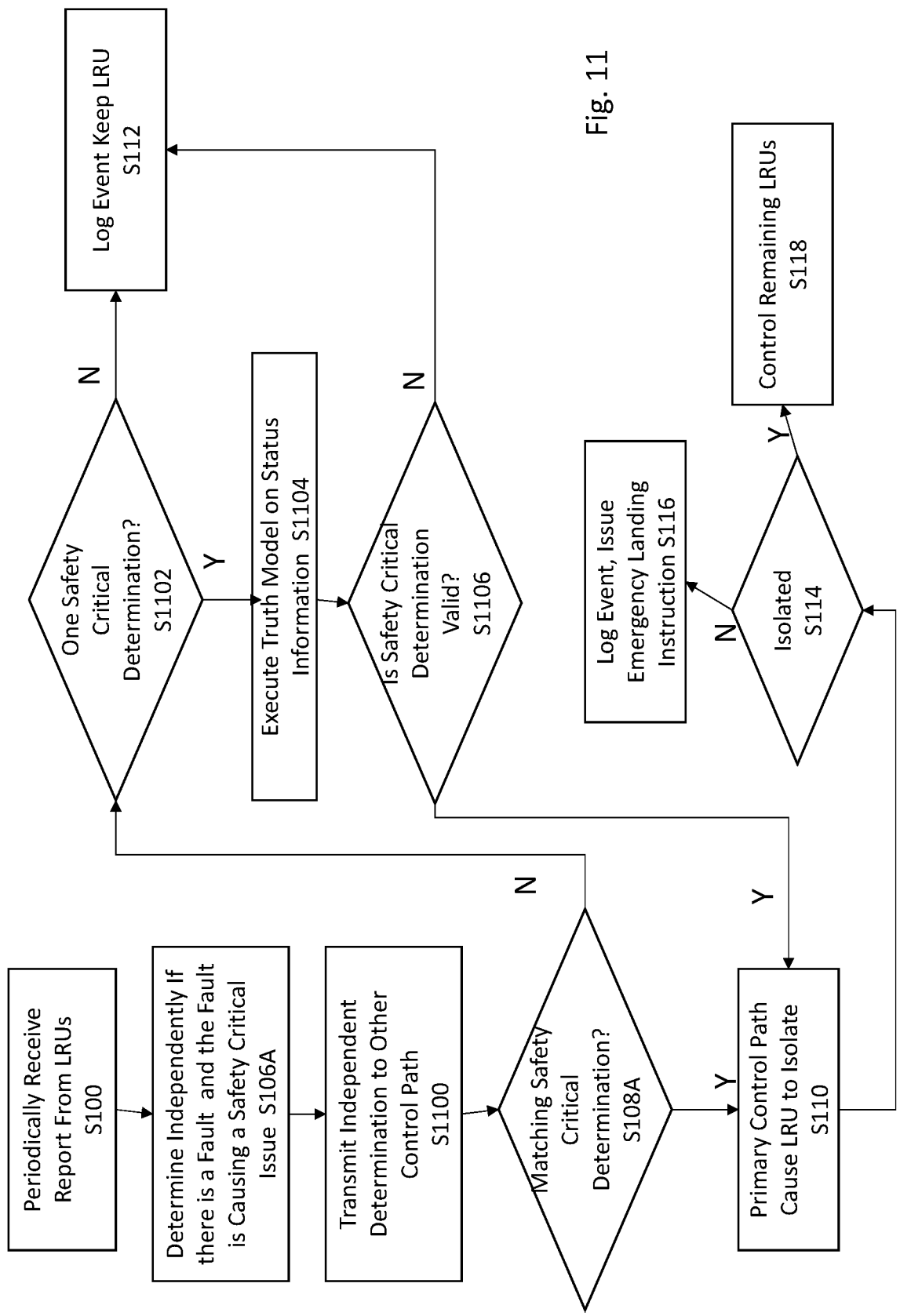
FIG. 11 illustrates a method of in-flight management of Line replaceable units connection in accordance with aspects of the disclosure for the system control unit in FIG. 10.

FIG. 11 illustrates another example of a redundant control of the connection status of LRUs 20, 25 during the in-flight operation of the aircraft. At S100, each processor 600 receives the status information from the LRUs, 20, 25 (each LRU). The reports are periodically received.

At S106A, each processor 600 independently determines if there is a fault and if there is a fault, the processor 600 independent determines if the fault to causing or probably will cause a safety critical issue.

Each independent determination is respectively transmitted to the other control path (other processor) at S1100.

The processors 600 determine if there is an agreement. When the control paths agree that there is a safety critical issue with an LRU (Y at S108A), the processor 600 for the primary control path issues a command to the faulty safety critical LRU to open the contactor 215/425A to isolate from the HVDC link 225A at S110.

When there is a disagreement and one of the control paths determines that the is a safety critical issue in one of the LRUs (N at S108A, but Y at S1102), a truth model is executed on the status information to independently confirm which of the determination of a safety critical issue is valid at S1104.

The truth model examines the raw sensor values and determines based on the sensor values whether there is a safety critical issue in a LRU. In other aspects of the disclosure, a voting engine may be executed by one or both of the processors 600. The voting engine may be executed by an external processor.

When the truth model confirms that there is a safety critical issue in the LRU (valid safety critical determination)

(Y at S1106), the processor 600 for the primary control path issues a command to the faulty safety critical LRU to open the contactor 215/425A to isolate from the HVDC link 225A at S110.

When the truth model determines that there is no safety critical issue in the LRU (invalid safety critical determination) (N at S1106), the processor 600 (in the primary control path) generates a report of the event and logs the event in memory 605 at S112. In an aspect of the disclosure, the log indicates that there was a disagreement.

When there is a fault, but there is an agreement that there is no safety critical issue (N at S1102), the processor 600 (in the primary control path) generates a report of the event and logs the event in memory 605 at S112. When the control paths do not confirm there is a fault in the first instance, the process returns to S100.

At S114, each processor 600 monitors and determines whether the fault safety critical LRU has been isolated from the HVDC link 225A by verifying the contactors/circuit breakers are open utilizing the appropriate sensors. If it is determined that the faulty safety critical LRU has been isolated (Y at S114), then the processor 600 (in the primary control path) continues to control the remaining LRUs based on propulsion command from the control cabin 40 at S118.

At S1, each sink LRU 25 and the EMS 10 receive a key-on signal from the control cabin 40. At S3, each sink LRU 25 runs its respective BIT. In the BIT, sensors within the LRU 25 report the sensed/detected values to the respective processor. The control unit 405A determines the results of the BIT and transmits the status information to each processor 600 in the redundant control paths.

At S1, each sink LRU 25 and the EMS 10 receive a key-on signal from the control cabin 40. At S3, each sink LRU 25 runs its respective BIT. In the BIT, sensors within the LRU 25 report the sensed/detected values to the respective processor. The control unit 405A determines the results of the BIT and transmits the status information to each processor 600 in the redundant control paths.

At S7, each processor 600 in the redundant control paths receives the status information. At S9A, each processor 600 in the redundant control paths independently determines whether the sink LRU 25 is ready to receive power. The determination may be based on the status information (and determination by the respective LRUs). Once the determination/confirmation is performed in each processor 600, each processor 600 transmits the independent determinations to the other processors 600 at S1100.

If there is an agreement between all of the processors 600 in each control path that there is a fault (safety critical fault), e.g., not ready to receive power (Y at S108A), the processor 600 in the primary control path generates a report indicating a fault and logs the report into memory at S11.

When there is a disagreement among the redundant control paths (N at S108A and Y at S1102), the processor 600 in the primary control path may execute a truth model to independently determine whether the initial determinations of the respective processor 600 are valid at S1104. As described above, the truth model may be in the reversionary control paths and/or in an external processor. Similar above, the truth model examines the sensor values to determine/confirm whether there is a safety critical fault in a sink LRU (e.g., ready to receive power).

At S1104, the truth model is executed by the processor 600 (or an external processor) to determine whether there is a fault (safety critical issue).

If the truth model determines that the safety critical determination is not valid (incorrect)(N at S1106) or if there is an agreement that there is no safety critical issue (N at S1102), the processor 600 in the primary control path issues an command to the sink LRU 25 to close its contactor 425A and connect to the HVDC link 225A at S13.

If the truth model determines that there is a safety critical issue (safety critical determination is valid) (Y at S1106), the processor 600 in the primary control path generates a report indicating a fault and logs the report into memory at S11. The processor 600 in the primary control path also does not issue a command to the sink LRU 25 to connect to the HVDC link 225A.

The processors 600 in the redundant control path execute a similar process for the source LRUs 20. However, in S9B, each processor 600 determines whether the source LRU 20 is ready to supply power.

When there is an agreement that there is a safety critical issue in a source LRU 20, the source LRU 20 is not connected to the HVDC link 225A (at S11) and a report is generated indicating a fault.

If the truth model determines that the safety critical determination is not valid (incorrect)(N at S1106) or if there is an agreement that there is no safety critical issue (N at S1102), the processor 600 in the primary control path issues an command to the source LRU 25 (if pre-charging is needed) to pre-charge or close the main contactor 215 in the turbo generator at S15. For example, the ESS 20A may need to be pre-charged. Thus, at S15, the processor 600 in the primary control path issues a command to the ESS 20A to close the contactor to pre-charge.

Figure 17:
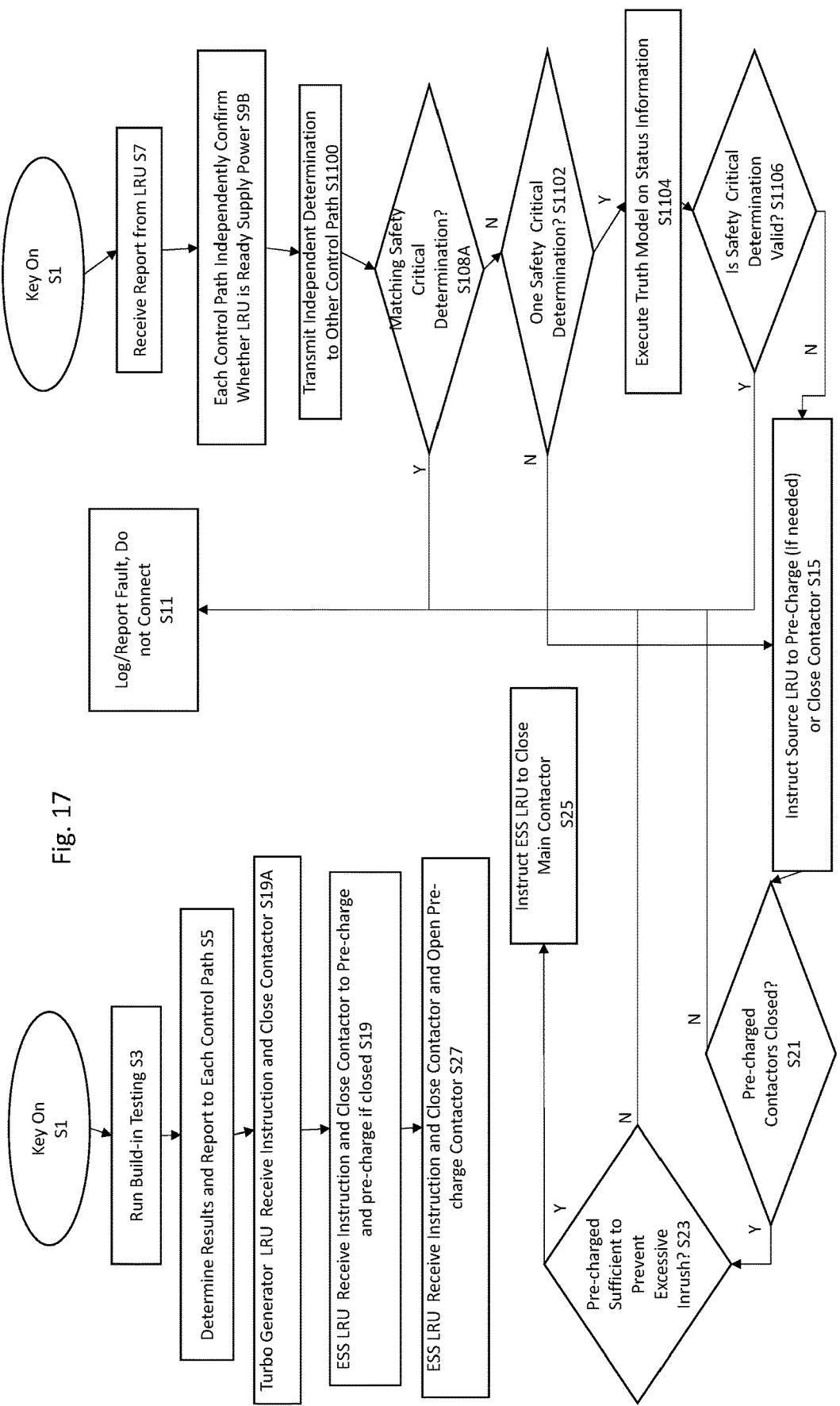

In an aspect of the disclosure, S21 and S23 in FIG. 17 may be executed by the processor 600 in the primary control path. In other aspect of the disclosure, S21 and S23 may be executed redundantly in each control path and if there is a disagreement, the truth model may be executed.

Once again, instead of a truth model, a voting engine may be used.

Figure 18:
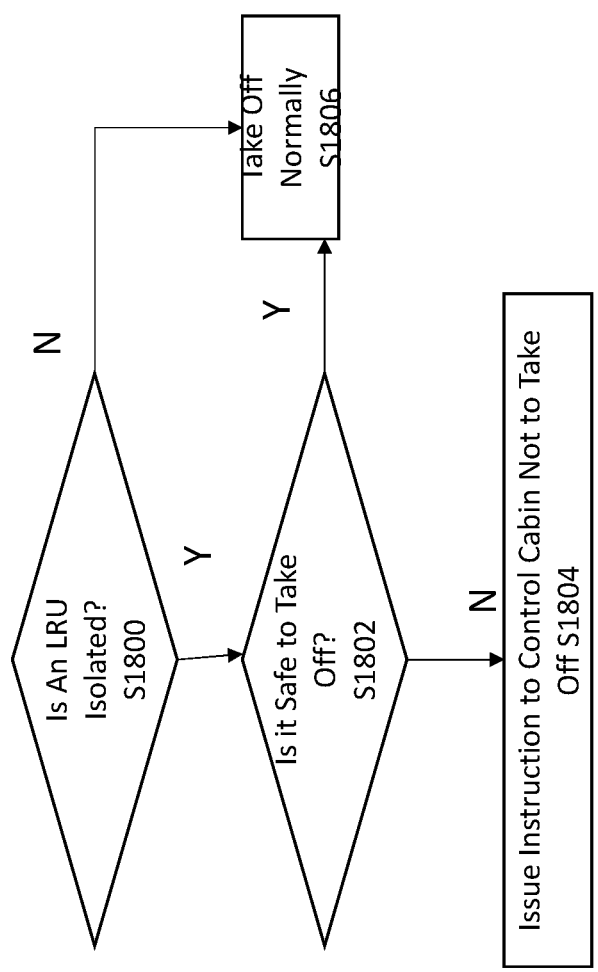

FIG. 18 illustrates an example of a method for determining whether to take off in accordance with aspects of the disclosure.

At S1800, the processor 600 in each of the control paths may determine whether an LRU 20, 25 has been electrically isolated from the HVDC link 225A (not connected). If all LRUs are connected, the processor 600 in the primary path may confirm with the control cabin 40 that the aircraft may take off at S1806 (e.g., normal take off). If the processor 600 determines that a LRU 20, 25 has been isolated, e.g., a faulty safety critical LRU that has not been connected, each processor 600 determines whether it is safe to take off without the isolated LRU at S1802. This determination may be architecture specific and aircraft specific. For example, the determination may be based on the number of ESS 20A, turbo generators 20B and electric propulsion units 25B remaining. The determination may also be based on the size of the aircraft, the extra capacity provided initially, the length of the flight and the mission.

When it is determined that it is safe to take off (Y at S1802) (all processors in all control paths agree), the processor 600 in the primary path may confirm with the control cabin 40 that the aircraft may take off at S1806 (e.g., normal take off). When all processors 600 (in all control paths) agree it is not safe to take off, the processor 600 in the primary control path issues a command to the control cabin 40 not to take off at S1804. In an aspect of the disclosure, when there is a disagreement, the truth model may be executed.

Figure 19:
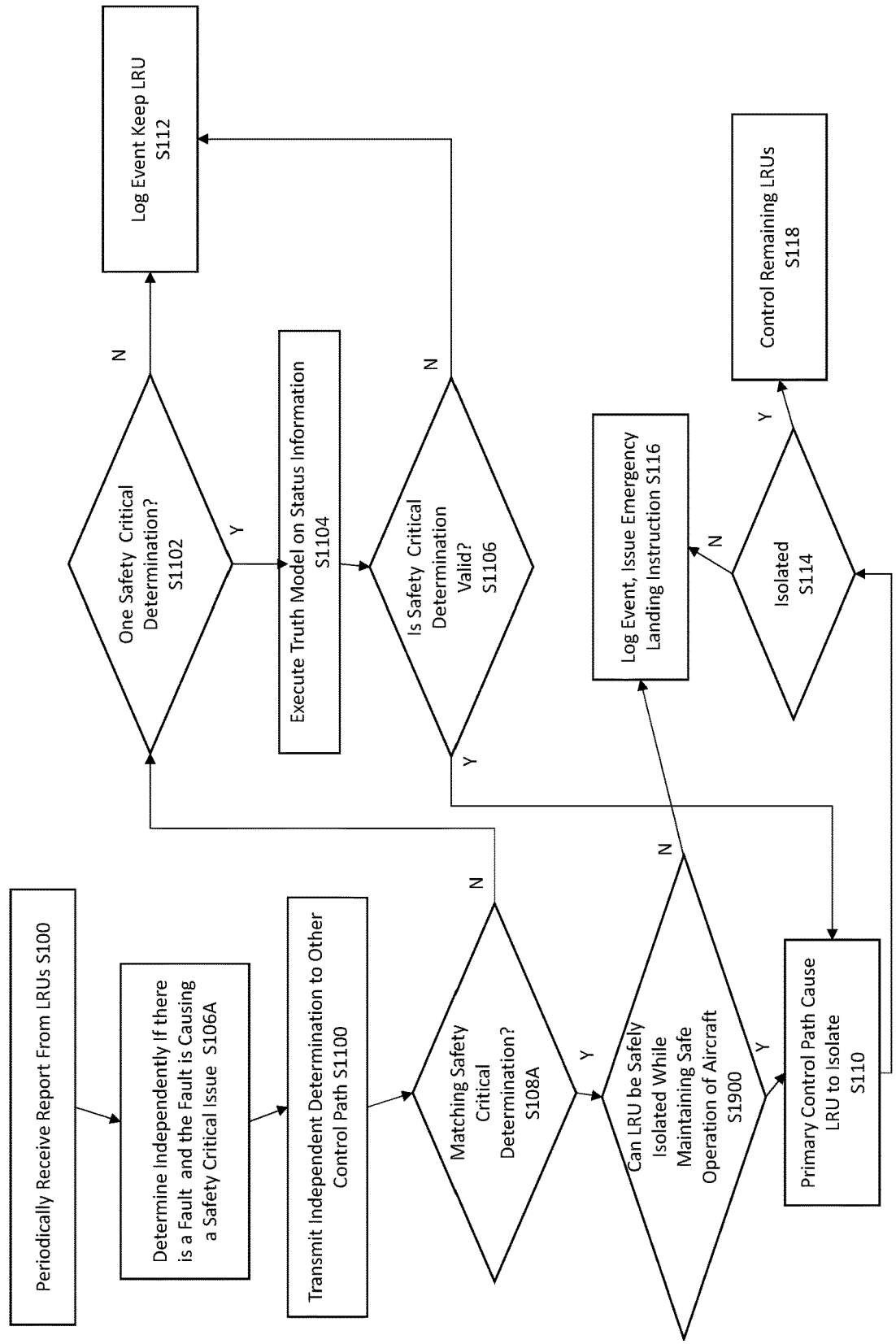
FIG. 19 illustrates a method of in-flight management of Line replaceable units connection in accordance with aspects of the disclosure for the system control unit in FIG. 15.

FIG. 19 illustrates another example of a redundant control of the connection status of LRUs 20, 25 during the in-flight operation of the aircraft. The difference between the examples in FIGS. 11 and 19 is prior to controlling the LRU 20, 25 to isolate, each processor 600 determines whether it is safe to isolate the LRU 20, 25 from the HVDC link 225A at S1900. If it is not safe, the processor 600 in the primary control path issues a command to have an emergency landing otherwise the process moves to S110.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative aspects of the disclosure.

While various inventive aspects have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive aspects described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive aspects described herein. It is, therefore, to be understood that the foregoing aspects are presented by way of example only and that, within the scope of the appended claims and equivalents thereto, inventive aspects may be practiced otherwise than as specifically described and claimed. Inventive aspects of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described aspects can be implemented in any of numerous ways. For example, aspects of the disclosure may be implemented using hardware, software, or a combination thereof. When implemented in software, the software code or instructions can be executed on any suitable processor or collection of processors, whether provided in a single computer or distributed among multiple computers.

Furthermore, the instructions or software code can be stored in at least one non-transitory computer readable storage medium.

Also, a computer may be utilized to execute the software code or instructions via its processors may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various aspects of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various aspects. As such, one aspect of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one aspect, to A only (optionally including elements other than B); in another aspect, to B only (optionally including elements other than A); in yet another aspect, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one aspect, to at least one, optionally including more than one, A, with no B present (and optionally including elements other than B); in another aspect, to at least one, optionally including more than one, B, with no A present (and optionally including elements other than A); in yet another aspect, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed aspects teach the features of components A and B, then there may be inventive subject matter in the combination of A and B, A alone, or B alone, unless otherwise stated herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one aspect, the features and elements so described or shown can apply to other aspects. It will also be appreciated by those of skill in the art that references to a structure or feature that is disposed "adjacent" another feature may have portions that overlap or underlie the adjacent feature.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An aspect is an implementation or example of the present disclosure. Reference in the specification to "an aspect," "one aspect," "some aspects," "one particular aspect," "an exemplary aspect," or "other aspects," or the like, means that a particular feature, structure, or characteristic described in connection with the aspects is included in at least some aspects, but not necessarily all aspects, of the invention. The various appearances "an aspect," "one aspect," "some aspects," "one particular aspect," "an exemplary aspect," or "other aspects," or the like, are not necessarily all referring to the same aspects.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various aspects of the disclosure are examples and the disclosure is not limited to the exact details shown or described. The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. An energy management system (EMS) for an aircraft, the EMS is configured to be connectable with a plurality of source line replaceable units (source LRUs) and a plurality of sink line replaceable units (sink LRUs), where a source LRU is a source of power for a high voltage DC link used for propulsion and a sink LRU uses the power from the high voltage DC link for propulsion, the EMS comprising:
   communication interfaces configured to receive status information from each of the source LRUs and sink LRUs, the status information comprising information from respective sensors within the respective LRU and a determination that the information from each sensor is within a predetermined range; and to transmit commands to the source LRUs and the sink LRUs; and
   redundant control paths for controlling safety critical operations, the redundant control paths being configured to independently determine whether to electrically isolate a LRU from the high voltage DC link based on the status information from the LRU, wherein isolation is based on the independent determination;
   wherein the redundant control paths also comprises a second control path, where the second control path comprises a human machine interface in a control cabin in the aircraft to display the status information and receive a command to isolate an LRU.

2. The EMS of claim 1, wherein the EMS is configured to achieve less than a threshold probability of a catastrophic failure.

3. The EMS of claim 1, wherein the aircraft has a parallel hybrid electric propulsion system or a parallel turbo hybrid electric propulsion system, and the redundant control paths comprises a first processor in a first control path, where the first processor is configured to electrically isolate a LRU from the high voltage DC link when the status information from the LRU indicates that the LRU determined that information from a sensor is outside the predetermined range for the sensor and a condition is satisfied wherein in response to the command, a LRU is electrically isolated from the high voltage DC link.

4. The EMS of claim 3, wherein each LRU and the first processor is configured to receive a key-on signal from the control cabin and wherein in response to the receipt of the key-on signal, a processor in each LRU performs a built-in test for the LRU and transmits the status information to the first processor via the communication interface, wherein the first processor is configured to confirm that each sink LRU is ready for power based on the respective determination and in response to the confirmation of being ready for power, issue a command to electrically connect the respective sink LRU to the high voltage DC link and configured to confirm that each source LRU is ready to supply power based on the respective determination, and in response to a confirmation of being ready to supply power, issue a command to a source LRU to pre-charge and when a preset pre-charge is reached, issue a command to electrically connect the source LRU to the high voltage DC Link.

5. The EMS of claim 4, wherein when the first processor does not confirm that a sink LRU is ready for power or a source LRU is ready to supply power, the first processor is configured not to issue a command to the sink LRU or the source LRU to electrically connect to the high voltage DC link.

6. The EMS of claim 1, wherein the aircraft has a parallel hybrid electric propulsion system or a parallel turbo hybrid electric propulsion system, and the redundant control paths comprises a primary control path and a reversionary control path, each control path comprises a processor, each processor is configured to receive the status information and determine whether to isolate a LRU from the high voltage DC link based on the status information and transmit the determination to the other processor, wherein when each processor determines that, based on the status information a condition is satisfied, the processor in the primary control path issues a command to the LRU to electrically isolate the LRU, and wherein when there is a different determination, the processor in the primary control path, the processor in the reversionary control path, or both or a processor in another control path executes a truth model to determine which determination based on the status information is valid, and wherein when based on the truth model it is determined that the determination that the condition is satisfied, the processor in the primary control path issues a command to the LRU to electrically isolate the LRU.

7. The EMS of claim 6, wherein the reversionary control path is configured to take over control of each LRU if the primary control path has a fault.

8. The EMS of claim 3, wherein a source LRU is an energy storage system, where the energy storage system (ESS) is configured to supply a first VDC.

9. The EMS of claim 8, wherein the high voltage DC link is a second VDC and the EMS further comprises a conversion circuitry configured to convert the first VDC from the ESS to the second VDC.

10. The EMS of claim 9, wherein the second VDC is larger than the first VDC.

11. The EMS of claim 3, wherein a source LRU comprises a prime mover, a generator and an inverter.

12. The EMS of claim 3, wherein the first processor is further configured to issue commands to each sink LRU based on propulsion commands from the control cabin.

13. The EMS of claim 12, wherein the first processor is further configured to adjust the command to sink LRUs electrically connected with the high voltage DC link when a sink LRU is electrically isolated from the high voltage DC link.

14. The EMS of claim 3, wherein the first processor is further configured to determine whether an LRU that was commanded to electrically isolate from the high voltage DC link is electrically isolated from the high voltage DC link and in response to a determination that the LRU is not electrically isolated issue a command to the control cabin to land.

15. The EMS of claim 2, wherein the aircraft has an electric propulsion system or turbo electric propulsion system or a turbo hybrid electric propulsion, and the redundant control paths comprises at least three control paths, the at least three control paths comprises a primary control path and at least two reversionary control paths, each control path comprises a processor and a communication interface,
 each LRU and each processor in the at least three control paths is configured to receive a key-on signal from the control cabin and wherein in response to the receipt of the key-on signal, a processor in each LRU performs a built-in test for the LRU and transmits the status information to each processor in the at least three control paths via the respective communication interface,
 wherein each processor in the at least three control paths is configured to independently confirm that each sink LRU is ready for power based on the respective status information and transmit the confirmations or lack thereof to the other processors in the other control paths, and wherein all control paths confirm that each sink LRU is ready for power, the processor in the primary control path issues a command to electrically connect the respective sink LRU to the high voltage DC link, wherein when one control path does not confirm that a sink LRU is ready for power and another control path does confirm that the sink is ready for power, the processor in the primary control path, or the processor in each control path or an independent processor executes a truth model to determine which confirmation output from each control path is valid, wherein when based on the truth model it is determined that the confirmation is valid, the processor in the primary control path issues a command to electrically connect the sink LRU to the high voltage DC link, and
 each processor in the at least three control paths is configured to confirm that each source LRU is ready to supply power based on the respective status information, and wherein all control paths confirm that each source LRU is ready to supply power, the processor in the primary control path issues a command to a respective source LRU to pre-charge and when a preset pre-charge is reached, issue a command to electrically connect each respective source LRU to the high voltage DC Link or electrically connect the respective source LRU to the high voltage DC link without pre-charge, and
 wherein when one control path does not confirm that a source LRU is ready to supply power and another control path does confirm that the source LRU is read to supply power, the processor in the primary control path, or the processor in each control path or an independent processor executes a truth model to determine which confirmation output from each control path is valid, wherein when based on the truth model it is determined that the confirmation is valid, the processor in the primary control path issues a command to electrically the source LRU to pre-charge and when a preset pre-charge is reached, issue a command to electrically connect each source LRU to the high voltage DC Link or electrically connect the source LRU to the high voltage DC link without pre-charge.

16. The EMS of claim 15, wherein each processor in the at least three control paths is configured to determine whether to electrically isolate an LRU based on the status information received from the respective LRU.

17. The EMS of claim 16, wherein the processor in each control path is configured to receive the status information via its respective communication interface and determine whether to isolate a LRU from the high voltage DC link based on the status information and transmit the determination to the other processor in the other control paths, wherein when the processor in each control path determines that, based on the status information a condition is satisfied, the processor in the primary control path issues a command to the LRU to electrically isolate the LRU, and wherein when there is a different determination, the processor in the primary control path, the processor in each reversionary control path, or another processor executes a truth model to determine which determination based on the status information is valid, and wherein when based on the truth model it is determined that the determination that the condition is satisfied, the processor in the primary control path issues a command to the LRU to electrically isolate the LRU.

18. The EMS of claim 17, wherein the control cabin comprises a human machine interface configured to receive an override, wherein in response to the override, an electrically isolated LRU is commanded to reconnect to the high voltage DC link.

19. The EMS of claim 15, wherein the processor in each of the at least three control paths is configured to receive propulsion commands from the control cabin and independently determine commands and the processor in the primary control path issue commands to each sink LRU.

20. The EMS of claim 15, wherein a source LRU is an energy storage system, where the energy storage system (ESS) is configured to supply a first VDC, wherein the EMS further comprises conversion circuitry.

21. The EMS of claim 20, wherein the conversion circuitry is a DC-to-DC converter, wherein the DC-to DC converter is configured to convert the first VDC into a second VDC, wherein the second VDC is supplied as an accessory power supply.

22. The EMS of claim 20, wherein the conversion circuitry is a DC-to-AC converter, wherein the DC-to AC converter is configured to convert the first VDC into a first AC, wherein the first AC is supplied as an accessory power supply.

23. The EMS of claim 15, wherein a source LRU comprise a turbo generator and the processor in each of the at least three control paths is configured to receive propulsion commands from the control cabin and independently determine commands and the processor in the primary control path issue commands to each sink LRU and to a processor in the turbo generator.

* * * * *